(12) United States Patent
Andoh

(10) Patent No.: US 12,397,482 B2
(45) Date of Patent: Aug. 26, 2025

(54) METHOD FOR PROVIDING INTEGRATED COMPOSITE ARTICLE MADE OF METAL AND RESIN

(71) Applicant: ANDOH-Corporation limited partnership company, Kanagawa (JP)

(72) Inventor: Naoki Andoh, Kanagawa (JP)

(73) Assignee: ANDOH-Corporation limited partnership company, Kanagawa (JP)

( * ) Notice: Subject to any disclaimer, the term of this patent is extended or adjusted under 35 U.S.C. 154(b) by 136 days.

(21) Appl. No.: 18/519,103

(22) Filed: Nov. 27, 2023

(65) Prior Publication Data

US 2024/0173903 A1 May 30, 2024

(30) Foreign Application Priority Data

Nov. 29, 2022 (JP) .................................. 2022-190705

(51) Int. Cl.
| | |
|---|---|
| B29C 45/14 | (2006.01) |
| B29C 45/00 | (2006.01) |
| B29C 45/76 | (2006.01) |
| B29K 77/00 | (2006.01) |
| B29K 105/00 | (2006.01) |
| B29K 105/12 | (2006.01) |

(Continued)

(52) U.S. Cl.
CPC .... *B29C 45/14008* (2013.01); *B29C 45/0005* (2013.01); *B29C 2045/14868* (2013.01); *B29C 45/76* (2013.01); *B29K 2077/00* (2013.01); *B29K 2077/10* (2013.01); *B29K 2105/0085* (2013.01); *B29K 2105/12* (2013.01); *B29K 2305/02* (2013.01); *B29K 2309/08* (2013.01)

(58) Field of Classification Search
CPC ... B29C 45/16; B29C 2045/135; B29C 45/13; B29C 45/10; B29C 45/08; B29C 45/07; B29C 43/361; B29C 65/3656; B29C 2045/1696; B29C 45/0005; B29C 45/14344; B29C 45/14008
See application file for complete search history.

(56) References Cited

FOREIGN PATENT DOCUMENTS

| JP | 2004050488 | 2/2004 |
|---|---|---|
| JP | 2007050630 | 3/2007 |

(Continued)

OTHER PUBLICATIONS

Taisei Plas Inc et al., "Composite material of laminated aluminum and CFRP having a high specific strength; developed in cooperation by Taisei Plas Inc. and Toray Inc.", Nikkei cross-tech, Exhibition of technology of mechanical elements, Jun. 24, 2009, pp. 1-2.

*Primary Examiner* — Stella K Yi
(74) *Attorney, Agent, or Firm* — JCIPRNET

(57) ABSTRACT

A method for providing an integrated composite article made of a metal and a resin is provided. A crystalline thermoplastic resin composition is provided as a resin material. A plate material of various kinds of Al alloys having a thickness of 0.5 to 1.5 mm and having been subjected to a chemical treatment of NMT and cut out to be of a form and a dimension is placed in a metallic mold for an injection molding and injecting the crystalline thermoplastic resin composition into the metallic mold to form the integrated composite article having a final plate shape including curved face portion. The integrated composite article is provided as a roof of an automobile, and contribute to promotion of lighter weight of a vehicle, reduction of $CO_2$, coping with problems of global warming.

3 Claims, 8 Drawing Sheets

(51) Int. Cl.
  *B29K 305/02*   (2006.01)
  *B29K 309/08*   (2006.01)

(56) References Cited

FOREIGN PATENT DOCUMENTS

| | | |
|---|---|---|
| JP | 2007182071 | 7/2007 |
| JP | 2010064397 | 3/2010 |
| JP | 2010064498 | 3/2010 |
| JP | 2017132243 | 8/2017 |
| JP | 2018111277 | 7/2018 |
| JP | 2019217704 | 12/2019 |
| JP | 2020100248 | 7/2020 |
| JP | 2021095385 | 6/2021 |
| JP | 2022071227 | 5/2022 |
| WO | 2008047811 | 4/2008 |
| WO | 2008078714 | 7/2008 |
| WO | 2008081933 | 7/2008 |
| WO | 2009011398 | 1/2009 |
| WO | 2021070654 | 4/2021 |

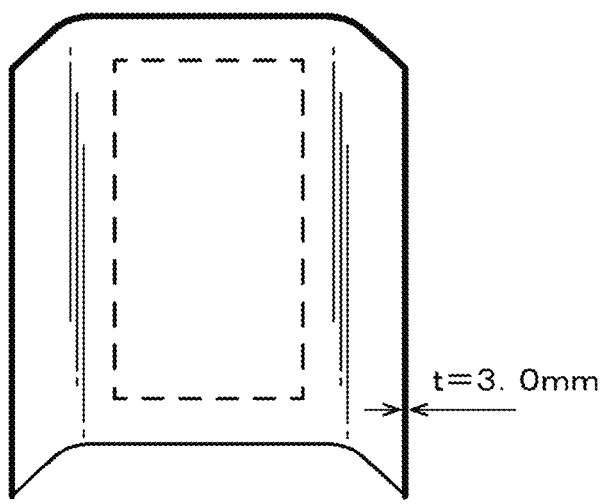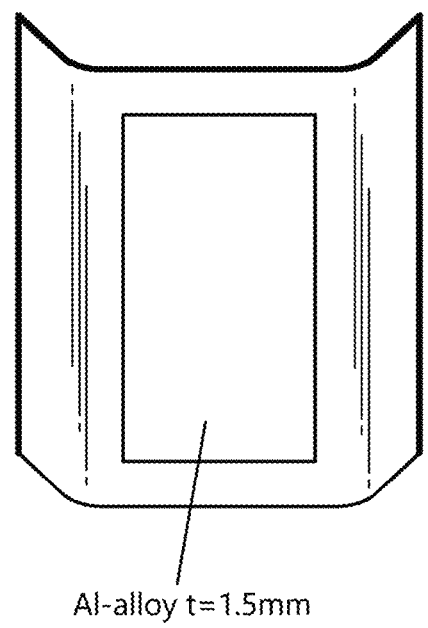
FIG. 8A
FIG. 8B

METHOD FOR PROVIDING INTEGRATED COMPOSITE ARTICLE MADE OF METAL AND RESIN

CROSS-REFERENCE TO RELATED APPLICATION

This application claims the priority benefit of Japan application serial no. 2022-190705, filed on Nov. 29, 2022. The entirety of the abovementioned patent application is hereby incorporated by reference herein and made a part of this application.

TECHNICAL FIELD

Embodiments of the present invention relate to a member for moving machinery including an automobile and a method for producing the same. In a more detail, the member for moving machinery in embodiments of the present invention relate to a composite article of metal and resin obtained by integrating strongly a main structural material with a subsidiary structural material with a technique of joining by injection molding, either using a plate-shaped article of a particular thermoplastic resin composition having a high strength and a high heat resistance as a main structural material and using a plate-shaped article of aluminum alloy as a subsidiary structural material, or using a rod-shaped article of aluminum alloy as a main structural material and using a material of a particular thermoplastic resin composition having a high strength and a high heat resistance formed by injection molding, which will be employed as a kind of structural member in place of a thin steel plate for an automobile.

BACKGROUND ART

The member for a moving machinery according to the present invention is an integrated composite article having a light weight and a high strength that would appear as a substitution with a lighter weight of a roof, a fender, a door, a seat, etc., of an automobile, for which thin steel sheets have been used conventionally as a basic manner. While automobiles are to change from cars with gasoline engines to hybrid cars, fuel-cell cars, electric-motor cars, etc., for coping with global warming problems, it is expected that currently mass-produced articles or articles produced by mass-producing methods corresponding to ones having been developed at present will be employed as tires, driving portions including electric motors, energy providing or transmitting portions such as hydrogen tanks, fuel cells or secondary batteries, and essential structural portions of moving machinery for any kind of automobile. That is, while electric passenger cars produced and sold now by Tesla Inc. in U.S., in which Al alloy for casting is employed also for a chassis portion, gather worldwide attention as high class passenger cars, it seems that structural members made of Al alloy requiring too high cost are not employed but steel member are used as conventional for chassis portions of general-purpose electric automobiles to be sold in global markets.

There is no structural material more excellent than steel materials with which particularly weldability is very excellent, and such preparation arrangement is secured that articles such as specific steel or thin steel sheet having excellent mechanical property can be supplied in an abundant mass. On the other hand, while preparation arrangement is secured that articles of Al alloys having excellent mechanic property can be supplied in an abundant mass and for many kinds, supplied articles thereof are of plate members or thin sheet members and intermediate articles as window sash members having high strength with specific shapes produced through extrusion are straight rod-shaped members similar to L-shaped steel or H-shaped steel. There is less freedom for bending thereof than for steel members and working for mass production thereof is not easy. Specifically, the largest weakness is in inferiority in weldability. Chassis portions of automobiles are of complicated shapes and also structural portions requiring highest mechanical property, thus, if they are to be assembled using plate-shaped rod material without depending on a welding method, mass production thereof in practical level cannot be attained without extreme difficulty considering expense for it.

Thus, there was no way other than forming articles having complicated shapes through casting and applying minor mechanical working to them, which was a problem in producing chasses of Al alloy that cannot be easily overcome. However, Tesla Inc. in U.S. developed a new Al alloy composition for casting and also a high-pressure casting method using the Al alloy. There is information that mechanical property can be obtained without performing heat treatment with this cast article, so it seems that the technique for practical appreciation of chassis made of Al alloy by Tesla Inc. is an excellent new technique. Here, the cast article cannot be taken out of the sand die as a casting die without breaking the die after high-pressure casting. Of course, there is also an additive expense for producing a casting die in high-speed using a high-speed 3D-printer. Thus, it is inevitable for expense for producing to be rather higher than for a current method using steel material. It is frequently deemed that such situation caused the price for of the electric automobile by the company to be 7 to 8 million yen (50 to 60 thousand dollars) for each. In short, these give a basis for expecting steel materials as conventionally used will be employed for chassis portions of general-purpose electric automobiles in the future as described above.

On the other hand, it is engine blocks of gasoline automobiles that has attained a big success by changing steel materials of automobiles to Al alloy. Engines made of Al alloy have been already employed all around the world and it brings about enormous "energy conservation" advantageous effect to in making automobiles have lighter weight. Here, electric automobiles in recent enormous competition have no engine originally, thus major producers of automobiles are in situation of abolition or reduction of engine producing divisions or divisions improving-developing engines at present. It is desired to convert all members using Al alloy for lighter weight.

However, structures using steel material will be still employed for chassis portions, as explained above, and moreover, also it is unexpectedly difficult to change steel structure of other portions such as fenders, roofs, doors, back doors, seats, etc., to structure of Al alloy, though it seems bring about reduction of weight. The reason for it consists in that press forming of Al alloy is difficult. As Al alloy has spring back property, press forming rightly as a die is not easy, thus press formed articles of thin steel sheet are easier to use as sheet members having curved faces. Although doors of Al alloy are employed for high-class automobiles in Japan, there is no expectation that such is employed also in general-purpose automobiles. It seems that stable production thereof is not easy.

Techniques of producing electric automobiles were not developed originally by firms producing automobiles, but they were acquired only under techniques developing ability of motor producers and producers of secondary batteries, and all of the electric automobiles to be produced and sold hereinafter will be produced under supply of motors, batteries and required electric-electronic machineries from other firms. Thus, produced electric automobiles themselves are apt to be similar to each other irrespective countries producing them, Japan, Germany, U.S., China, etc., and serious competition of new electric automobiles will be developed during 2020s.

The present inventor thinks that the articles to be a leading part according to the present invention, that is, an integrated composite member (basically of a plate shape) of metal and thermoplastic resin can be a leading part in place of current structures of thin steel plates in a global competition of production of automobiles not only of electric automobiles but also ones including fuel cell cars, hybrid cars and gasoline-engine cars in the future for the all portions other than the chassis among the body portions of an automobile, that is, fenders, doors, back doors, seats, etc. However, such a view point is not discussed even by specialists of automobile industry.

In short, although it is true to say that "global environmental issues", that is, reduction of "$CO_2$" is a major target for all the world, this should not be a simple matter as to say abolition of all the automobiles having engines and change of all to electric automobiles. For countries or arears where engine automobiles or hybrid automobiles are used, they cannot be abolished and must not be abolished. Reduction of $CO_2$ includes, besides increasing electric automobiles, changing use of coal or petroleum as fuel for thermal power generation to use of natural gas and, further to say, use of safe nuclear power generation in which cooling of nuclear reactor never stops. Those will be targets of technology and investment strategy that each state is to deal with. The due way for producers of automobiles to go along is of "energy conservation", and if making automobiles have lighter weight advances, it will provide effective reduction of $CO_2$. Thus, producers of automobiles should develop mass production technology of electric automobiles all of cheap price at first and additionally thereto make an effort to change portions of steel material to ones made of Al alloy, promoting lighter weight of automobiles so as to reduce $CO_2$.

Here, the present inventor supposes whole structure, not in which fenders or door members are made of Al ally plate itself, but in which plate members having curved faces are formed of integrated composite articles consisting of Al alloy and high-quality resin and current techniques are employed in frame structures of steel materials for attaching the plate members.

There are a group of inventions as basic techniques on which the present invention has been created, and most of the group of inventions have been already published in and out of Japan. Patent Documents 1 to 17 regard to techniques of joining by injection molding to which the present invention is related particularly and abstracts thereof will be explained below. On the other hand, while there are techniques of joining with adhesive NAT (Nano adhesion technology) as related techniques (Non-patent Document 1), but since it has little relation to the gist of the present invention, detailed explanation will be omitted.

(Techniques of Joining by Injection Molding)

In "NMT (Nano Molding Technology)" as technology of joining by injection molding, NMT treatment as chemical treatment is applied to an Al alloy material, preparing an article with its surface configuration and chemical property at least such that the whole surface is covered with ultrafine irregularities of 10 to 100 nm period and has hydrazine hydrate chemically adsorbed on the surface. On the other hand, high crystalline thermoplastic resin (for example, any of PBT, PPD, polyamide resin and PAEK resin including PEEK) as a primary constituent and resin different from the main constituent resin and having miscibility with it if possible as a secondary constituent are prepared, and then, resin of a third constituent assisting miscibility even if miscibility is incomplete is added to the resins when miscibility between the former two high molecules is weak, which results in a total resin constituent. The total resin constituents are molten and mixed to be resin constituents. Particularly, whole resin of 100 mass part contains a primary constituent resin of 70 to 90 mass part, secondary constituent resin of 30 to 10 mass part and a third constituent resin of 0 to 2 mass part. Beside this, GF (short glass fiber) or inorganic powder as filler or reinforcement is added to this by 0 to 35 mass % of the whole resin constituents to be molten and mixed therein, thus providing crystalline thermoplastic resin composition (for joining by injection molding).

The purpose of the resin composition having complex composition consists in arranging such that the resin is injected from an injection port of an injection molding machine into a metallic mold for injection molding, the molten resin flows passing through a path within the metallic mold under cooling and collides with an Al alloy piece preliminarily having been treated by NMT and inserted in the metallic mold and favorable, remarkable and large change in physical-chemical property of the resin composition occurs during time when the resin in flow state stops suddenly.

Thereby, the resin in flow state is subjected to sudden cooling and speed of crystallization, beginning just after overcooled state has been broken under physical impact as sudden stop of flow state, is lowered remarkably compared with usual case where primary constituent resin is contained by 100% (speed of crystallization is restrained remarkably). With this, it is enabled to restrain urgent rise of liquid viscosity of resin composition and so the resin composition can flow deeply into ultrafine concaves formed on the Al alloy surface.

Even if a forward end of injected resin collides with the Al alloy piece having been inserted in the metallic mold and crystallization of the primary constituent resin of the resin begins, the resin penetrates substantially up to a deep end of the ultrafine concaves of on the surface of the Al alloy piece as explained above and, after then multiple microcrystals having been already created simultaneously grow up to limit to be solidified, if speed of the crystallization has been caused to be slow, so that the Al alloy piece with the resin composition come to be in strong joined state. Further, amine molecules (hydrazine hydrate in NMT treatment) have been preliminarily adsorbed chemically onto the surface of the Al alloy piece having been inserted, and the primary constituent resin (PBT, PPS, polyamide, or others), etc., just in a state of crystallization collides with such amine molecules. The primary constituent resin necessarily reacts when it collides with the amine molecules at a high temperature and molecular movement such as cutting down of high molecules occurs instantly, thus generating heat, with which motion for crystallization is restrained.

The purpose causing amine molecules to be chemically adsorbed onto the metal piece to be inserted in the metallic mold preliminarily is same as one for restraining speed of crystallization of the primary constituent resin created when resin of high crystalline thermoplastic resin having a different kind of high molecules mixed therein and in a molten state is suddenly cooled. In such a manner, with an operation of joining by injection molding using an injection molding machine in which an Al alloy piece is joined with resin containing high crystalline thermoplastic resin adjusted for joining by injection molding, an integrated article of Al alloy piece and molded resin material having a high joining strength is formed.

In order to measure joining strength of a prepared integrated article of Al alloy piece and molded resin, articles joined by injection molding having shapes as shown in FIGS. 1 and 2 are prepared, shear joining strength and tensile joining strength each of the prepared articles are measured and multiple data thereof are obtained for study. Including results as to how about shear joining strength of the shaped articles having been subjected to various circumstances during a long period and through endurance test, it can be said that sufficient achievement has been obtained with NMT as a basic technology for preparing parts and members of moving machines.

SNMT as basic technologies of joining metal with resin for all metals or metal alloys including Al alloy.

With New NMT (New Nano Molding Technology), applying chemical treatment of New NMT treatment on any of all metals or metal alloys including Al alloy, surface configuration with fine irregularities of 0.8 to 10 μm period is formed on the metal, and further applying appropriate chemical treatment, articles having complex dual irregularities on the surface is prepared, in which surface configuration with ultrafine irregularities of 10 to 100 nm period is laid on the surface with fine irregularities of μm order, is prepared. On the other hand, resin composition just same as one used for NMT explained above is prepared as resin composition used for joining by injection molding. The method of New NMT does not include treatment process in NMT of chemically adsorbing amin molecules on the metal piece. This is due to a situation such that chemical adsorption of amine molecules is not attained well for metals or metal alloys other than Al alloy.

With "SNMT (Special Nano Molding Technology)", applying chemical treatment of New NMT treatment on any of all metals or metal alloys including Al alloy, surface configuration with roughened irregularities of 20 to 50 μm period and also with fine irregularities of 0.8 to 10 μm laid on the roughened irregularities is formed on the metal, and further applying appropriate chemical treatment, articles having overlapping complex dual-three-fold irregularities on the surface, in which surface configuration with ultrafine irregularities of 10 to 100 nm period is laid on the surface with fine irregularities, are prepared. Adding to this, the prepared articles are immersed in an aqueous solution of amin molecules or amine molecular salt for a long time, thereby physically adsorbing amin molecules on the surface of the articles. While examples thereof are disclosed in Patent Document 16, when PPS resin or polyamide resin is used for joining by injection molding for Ti alloy or part of stainless steels, shear joining strength of 40 MPa or 55 to 60 MPa can be attained in a stable manner, which is a highest value of joining strength for each resin.

(Applied Technology of Joining by Injection Molding, Etc.)

"NMT", "New NMT" and "SNMT" are basic technologies of joining by injection molding. There were many development technologies necessary for utilizing the basic technologies as practical technology, particularly as for moving machines. Shortly to say, it concerns to durability of joining strength by injection molding, specifically durability against moisture and/or heat. When articles joined by injection molding are placed in a circumference of high temperature and high humidity for several thousand hours, their shear joining strength is necessarily lowered. In this, composites of metal and resin joined by injection molding with a shape shown in FIG. 1 were placed under a situation of high temperature of 85° C. and high humidity of 85% for 3000 to 8000 hours, after which the situation was returned to normal one and shear strength thereof was measured. With such procedures repeated many times, durability of the articles was studied. As results thereof, there were many articles exhibiting substantially no lowering of shear joining strength from the initial values. Regarding those, it seems that joining operation was performed completely, there was durability in combination of configuration of ultrafine irregularities of the surface layers of metal material and resin material providing basic joining faces and fine structure thereof, and creation of rust on the metal material side (metal hydroxide) or deterioration of the resin material side through hydrolysis did not occur substantially.

(Image of Complete Joining and Gas Sealing Property)

Regarding articles taken as being of complete joining operation, as explained above, it was understood that resin part has penetrated up to the bottom end of concaves of ultrafine irregularities with 10 to 100 nm period through operation of joining by injection molding and it was expected that not only water molecules, oxygen molecules and nitrogen molecules but also hydrogen molecules and He gas cannot easily pass through the joining face. So pressured gas leakage test of He gas for a joining face of joined composite by injection molding of Al alloy A5052 with PPS resin "SGX120" (made by Toso Co. Ltd.) was conducted and it was confirmed that sealing property of the joining face is more excellent by several hundred times compared with sealing with O-ring of rubber. Similarly, pressured gas leakage test of He gas for a joining face of joined composite by injection molding of Cu C1100 with PPS resin "SGX120" (made by Toso Co. Ltd.) was conducted and it was confirmed that sealing property of the joining face is more excellent by several decade times compared with sealing with O-ring of rubber (Patent Document 8).

The above two gas sealing techniques are far superior to level of those utilized for completely preventing water molecules from penetrating into electrode liquid within a current LIB (Li ion battery) in which Al alloy and Cu are used as leader members of electrodes and PPS resin is used as a battery case. Current LIB of sealing by O-ring of rubber is taken as sufficient performance to use it for 5 years, so the above complete sealing techniques recommended by the present inventor do not come to be employed. However, if life of LIB becomes more than 10 years with the complete sealing techniques, speed of consuming Li resources will become half or less.

In anyway, NMT, New NMT and SNMT are technologies that can upgrade a joined article of a metal piece with molded resin material up to one with complete joining. In short, when test pieces for measuring shear joining strength having a shape shown in FIG. 1 are prepared through joining by injection molding in a most ideal manner with any of NMT, New NMT and SNMT and test of shear joining strength shows 40 MPa with PPS resin used and 55 MPa with polyamide resin used, it is considered that these provide gas sealing property similar to ones explained above, because these are near to ones of complete joining. Therefore, an article joined by injection molding having very high gas sealing property should reveal durability basically in a test of high-temperature and high humidity if primary resin itself has no hydrolysis.

(Measures for Coping with Difference of Linear Thermal Expansion Between Metal Material and Resin Material)

Even if an ideal article joined by injection molding can be prepared by joining a metal material with thermoplastic resin with techniques of joining by injection molding explained above, the article in practical use has not simple shapes as shown in FIGS. 1 and 2. Further, to say of circumference under which such a joined article is used, even if considered merely in Japan and for parts or members of a moving machine such as an automobile, there are a case of −30° C. in a middle east district of Hokkaido in winter and 40° C. in an inland district of Honshu in summer. If used in countries where the moving machine is exported, such as Alaska, Siberia, etc., there is −50° C. in winter, and also 50° C. in a salt zone in Ethiopia. Further, without remaining at a matter of temperature, an automobile has heat generating parts such as an engine or motor, and moreover, temperature of exterior parts such as fenders, doors, etc., exposed to sun light may rise near to 100° C. when the automobile is in a stop state with no wind, though for several hours under sun light and depending on the place for use. In short, as a metal material and resin material have linear expansion coefficients different from each other, even if an article joined by injection molding that has once completed and been of OK for durability test, it alone will be insufficient. The present inventor, considering difference of linear expansion coefficients between a metal material and resin material in an article joined by injection molding, studied also joined structure and joined shape with which the structure integrated through joining by injection molding is not influenced by thermal impacts of 150° C. and −50° C. repeating in 3000 cycles conducting experiment and disclosed basic techniques thereof (Patent Document 14).

(Relation of Complete Joining of Metal Material with Resin Material to Linear Expansion Coefficient of the Integrated Composite)

On the other hand, a plate-shaped article formed by injection molding using a resin material of a specific polyamide composition "CM3506G50" same as the above explained and having thickness of 1.5 mm is to be dealt with, in which the metal part consists of two thin plates each having a thickness of 0.75 mm. In a case where these three materials are integrated to be a thick plate with three layers having a thickness of 3 mm in such a manner that two thin plate of Al alloys are inserted preliminarily into a metallic mold for injection molding with a space kept between them and then after the above resin is injected into the intermediate space between the two plates of Al alloys, thus providing the integrated thick plate in which the three plates are joined over the whole faces between each other by highest techniques of joining by injection molding (in a manner near to complete joining to be an integrated composite thick plate consisting of three layers and having a thickness of 3 mm), how becomes linear expansion coefficient of the obtained plate composite. As linear expansion coefficient of the molded resin article is $(3-3.5) \times 10^{-5} K^{-1}$ and linear expansion coefficient of Al alloy A5052 is $2.4 \times 10^{-5} K^{-1}$, this corresponds to a case of rather small difference of the linear expansion coefficients between each other. In such a case, it seems that linear expansion coefficient of the resin part, conceding on its side, becomes near to a value of $2.5 \times 10^{-5} K^{-1}$.

In fact, in order to theorize it, it is necessary to form a plate-shaped article of specific polyamide resin composition "CM3506G50" containing GF by 33.3 wt % having a thickness of 1.5 mm by injection molding and to measure precisely change of length of the obtained plate-shaped article along lines in various directions according to change of temperature. Actually, this measurement is unexpectedly difficult. Coming to know that according to through which pin gate injection of resin was conducted, whether not through a pin gate but through a side gate resin was caused to flow in from the side, etc., linear expansion coefficient changes as direction or position of measurement becomes various, more complicated theory seems to be necessary for analyzing data. Further to say, it is also to be known that there was substantial change also in measurement of a sample of molded article having a simplest rectangular shape formed by causing resin to flow in through the shorter side as large amount of GF by 33.3 wt % is contained in the resin.

For example, when linear expansion coefficient was measured regarding lines parallel to the longer side, there was dispersion in measured values as $3.2 \times 10^{-5} K^{-1}$ to $3.8 \times 10^{-5} K^{-1}$. When constituent of GF is of large amount as 25% or more, there was dispersion in linear expansion coefficient of articles formed by injection molding according to thickness or length of fibers or a little difference of condition in production. While considering this, the producer of the resin "CM3506G50" (Toray Industries Inc.) states in a catalogue of the product that the molded article of resin is one providing smooth and clear sense of contact without protrusion of GF fiber ends on the surface although it contains large amount of GF. This shows in general characteristics of an article obtained by injection molding or extruding of amorphous thermoplastic resin containing filler of inorganic powder, etc., up to about 35% and says of a fact that there is only tiny amount of solid filler having been added to surface layer portion up to a depth of about 10 μm.

A resin process technician says that there is a "skin layer" regarding a situation in which thin surface layer of such molded article of thermoplastic resin substantially does not contain so called filler such as solid powder, reinforcing short fiber, etc. The above example is expressed such that there is a skin layer having thickness of about 10 μm. However, high crystalline thermoplastic resin having a large amount of filler by 33.3 wt % added thereto is a major constituent in the resin "CM3506G50" and, generally speaking, some portions necessarily occur in the molded article where ends of filler GF are exposed. Thus, there is substantially no chance that such article formed by injection molding is a molded article providing smooth and clear sense of contact. However, surface layer of a molded article of polyamide resin "CM3506G50" becomes clear as a mirror surface just as realized by finish with a metallic mold. To say why so, this is because resin composition contained in this resin composition has become crystalline resin of very low speed of crystallization when subjected to sudden cooling, thus it has become very similar to an article formed by injection molding of amorphous as a result.

Detailed explanation of this concerns details of resin composition itself as to what polyamide resin in the polyamide resin "CM3506G50" is. To say it miscellaneously, the substance of polyamide resin discussed here is a composition in which aliphatic nylon PA6 (6 nylon), PA66 (66 nylon), etc., having very high speed of crystallization when cooled suddenly and semi-aromatic nylon PA6I (mutual copolymer of hexamethylenediamine and isophthalic acid), PA6T (mutual copolymer of hexamethylenediamine and terephthalic acid), etc., having extraordinarily low speed of crystallization when cooled suddenly are mixed in a suitable ratio. Polyamide resin is adjusted to be in such a level of property of joining by injection molding that speed of crystallization is somewhat low, by composing polyamide resin to be a mixture of plural kinds of polyamide, which itself provides same action as improvement of transcription of a metallic mold at a time of usual production of articles by injection molding.

That is, when there is a metal material having been subjected to NMT treatment in a metallic mold, New NMT treatment or SNMT treatment, "CM3506G50" injected therein penetrates into ultrafine concaves on the surface of the metal material up to their bottoms and after then finishes crystallization, thus provides a joined article of metal-resin integrated in highest level. When ordinary injection molding is conducted, it is apt to create skin layer clearly. But when a metallic mold is such that polishing operation has been performed to be a mirror surface processing, the obtained article will be a clear molded article having mirror surface property as transcription is excellent. To say again, supposing that resin, having been in an overcooled state after flowing through a path within the metallic mold in a state of turbulent flow to be cooled without beginning of crystallization, stops suddenly due to stop in the path and crystallization begins under physical impact thereof, high molecules gather each other and fluid viscosity starts rising in the surface at the top end thereof where cooling occurs earliest.

At this, high molecules begin to gather in an aligned manner as crystallization expresses beginning of alignment of liquid high molecules each other, and thus, fillers such as GF or inorganic powder having been uniformly dispersed in a group of high molecules are expelled backward when crystallization is slow. While physicochemical entropy change in crystallization of high molecules gives reason for creating skin layer, with very high speed of crystallization, runaway velocity of large powders or short fibers of GF of about 1 mm length cannot catch up speed of crystallization of resin and skin layer becomes thin as a result and the molded article is apt to be of surface configuration without smoothness in which ends of GF are exposed only a little in the molded article. Further, as fluid viscosity increases according to fluid temperature lowering for a molded article of amorphous resin, speed of solidification of resin is further lower, so to speak, and high molecules gather with intermolecular forces each other, lowering level of thermal motion and raising fluid viscosity slowly in a manner as of tangling, thus advance towards solidification. While dispersed fillers are expelled from a group of gathering high molecules, speed of gathering of high molecules each other is low (commonly slower than speed of crystallization) and so fillers are pushed out slowly corresponding thereto, thus forming clear skin layer as a result.

After all, as a very interesting matter, a plate-shaped, rod-shaped or other shaped article obtained by injection molding of the somewhat specific polyamide resin "CM3506G50", being a molded one somewhat hard and rigid as it contains GF by 33% or more, is also an extremely special resin material that does not exhibit inferiority in transcription or dimension quality at a time of injection molding at all that may be easily occur for a resin containing a large amount of GF. In short, the present inventor thought that an article of this resin formed by injection molding is one clear, of excellent dimension quality and somewhat hard so that it can be utilized as a structural member. Then, it was considered that, as it is a resin suitable for technology of joining by injection molding NMT, New NMT or SNMT though it contains GF by 33% or more, it can be utilized in place of steel material according to a site of use when used as a composite member with a metal material.
(Question as to Whether Linear Expansion Coefficient of a Composite of Metal-Resin is Uniform)

Theory in background will be considered. At first, regarding linear expansion coefficient of the resin "CM3506G50" itself, linear expansion coefficient of glass itself is $(0.6-0.7)\times 10^{-5}K^{-1}$. Of course, linear expansion coefficient of GF itself is same as this. Regarding resin composition on one hand, it is well known that linear expansion coefficient of resin component itself is about $(5-6)\times 10^{-5}K^{-1}$ for amorphous resin and linear expansion coefficient and near to $10\times 10^{-5}K^{-1}$ for crystalline resin, and it seems that linear expansion coefficient of resin itself here is $10\times 10^{-5}K^{-1}$ as high crystalline resin is used here. However, as GF is also contained by 33.3% actually, thus linear expansion coefficient, that becomes lower as more filler is contained, became $(3-3.5)\times 10^{-5}K^{-1}$ as explained above. Regarding metal material on the other hand, linear expansion coefficient is about $2.4\times 10^{-5}K^{-1}$ for all Al alloys, about $1.6\times 10^{-5}K^{-1}$ for steel SUS304, about $1.1\times 10^{-5}K^{-1}$ for steel SUS430 or common steels and about $0.8\times 10^{-5}K^{-1}$ for Ti or Ti alloy.

In such a manner, all of metals have linear expansion coefficient lower than resin material, so even if an integrated article joined completely is prepared nearly at an ordinary temperature through techniques of joining by injection molding, difference of lengths between materials on both sides of the joining face respectively is created in natural, depending on whether circumferential temperature becomes higher or lower, so that inner shear stress is necessarily generated in both materials near to the joining face. In this, regarding linear expansion coefficient of the above explained molded article of resin "CM3506G50", linear expansion coefficient near to $10\times 10^{-5}K^{-1}$ as considered from only resin composition therein is lowered to be one near to $3\times 10^{-5}K^{-1}$, as GF having linear expansion coefficient of $(0.6-0.7)\times 10^{-5}K^{-1}$ in natural is mixed by a large amount. This shows that resin material itself is basically of soft nature and, when hard material having a low linear expansion coefficient is mixed thereto, the resin is easily attracted by mechanical property of the material.

From these, if an integrated article of metal material and resin material joined by joining technology by injection molding is of a combination exhibiting high joining strength with shear joining strength of 40 to 60 MPa for a joined article having a shape, for example, shown in FIG. 1, it seems that problems due to difference of linear expansion coefficient may not occur unexpectedly for a product as a composite circular rod plate in which a circular rod having a diameter of 10 mm as a metal material is combined with a thick plate covering material as a resin material having an inner diameter of 10 mm and an outer diameter of 15 mm. In a case where temperature is raised to 150° C., while it seems that the resin side is elongated and apt to peel off from the central metal circular rod as linear expansion coefficient of the resin side is higher than one on the metal side, it is similar even under condition of an ordinary temperature that the resin is apt to peel off, as the resin portion itself has very high linear expansion coefficient in nature.

Linear expansion coefficient of GF itself is about $0.6\times 10^{-5}K^{-1}$ rather lower than of metal material. Consequently, it seems unexpectedly difficult for breaking of fracture between the two materials due to difference of linear expansion coefficients to occur, if viewpoint is changed to such that both of the group of GF and the metal rod in center having hard nature with low linear expansion coefficient detain the resin portion having soft nature. Anyway, decisive condition is such that joined structure between a metal portion and a resin portion is near to that of complete joining and techniques of joining by injection molding is applied in a right manner. For a metal material of Al alloy, linear expansion coefficient is about $2.3 \times 10^{-5} K^{-1}$, and for a resin composition for joining by injection molding containing GF by 33.3% such as "CM3506G50", linear expansion coefficient thereof may be $(3-4) \times 10^{-5} K^{-1}$. In such a case, it can be said that difference between linear expansion coefficients of the metal material and resin composition may be rather small and also the above integrated article composed of rather thick portions each other can endure thermal impact test. To say for such a case, difference between linear expansion coefficients of the two materials is extinguished with the both being unified as $(2.4-2.5)$ $(3-4) \times 10^{-5} K^{-1}$ of Al alloy, thus the two materials are never split from each other due to change of temperature.

[Patent Document 1] JP, Patent Publication No. 2004-050488 A1 (NMTPBT)
[Patent Document 2] JP, Patent Publication No. 2007-050630 A1 (NMT PPS)
[Patent Document 3] JP, Patent Publication No. 2007-182071 A1 (NMT nylon)
[Patent Document 4] JP, Patent Publication No. 2010-064498 A1 (NMT PPS anodization)
[Patent Document 5] WO 2021/070654 (NMT2)
[Patent Document 6] WO 2008/081933 (New NMT SUS)
[Patent Document 7] WO 2008/047811 (New NMT copper)
[Patent Document 8] JP, Patent Publication No. 2017-132243 (New NMT copper sealing LIB)
[Patent Document 9] WO 2008/078714 (New NMT Ti)
[Patent Document 10] JP, Paten Publication No. 2010-064397 (New NMT Ti alloy)
[Patent Document 11] WO 2009/011398 (New NMT steel)
[Patent Document 12] JP, Patent Publication No. 2018-111277 (NMT PEEK)
[Patent Document 13] JP, Patent Publication No. 2017-132243 (New NMT copper wiska)
[Patent Document 14] JP, Patent Publication No. 2019-217704 (NMT shape of article joined by injection molding)
[Patent Document 15] JP, Patent Publication No. 2022-071227 (NMT semi-aromatic polyamide)
[Patent Document 16] JP, Patent Publication No. 2021-095385 (SNMT)
[Patent Document 17] JP, Patent Publication No. 2020-100248 (New NMT copper LIB viscosity)

[Non-Patent Document 1]
"Composite material of laminated aluminum and CFRP having a high specific strength; developed in cooperation by Taisei Plas Inc. and Toray Inc.", Nikkei cross-tech, Exhibition of technology of mechanical elements 2009, 06, 24

SUMMARY

While it is matters disclosed in Patent Documents 1 to 17 to replace current structural articles of steel materials or steel thin plates used in parts other than steel chassis or main structural portions placed thereon among parts of automobiles with three-dimensional shaped and integrated plate materials of metal and resin using high crystalline thermoplastic resin composition, such matters should securely contribute to promotion of lighter body weight of automobiles and energy conservation. While the matters are somewhat implemented for covering members of head lights or back lights, members of fender, etc. corresponding to recommendation to automobile producers by the present inventor, these does not attain to a level of consecutive implementation, partly due to problem of adjustment for season, etc.

This seems to be brought about for a major part by a situation in which automobile producers have not attitude of developing or producing for themselves of shaped members as integrated composite articles of metal and resin using mainly high crystalline thermoplastic resin composition. Considering this, it is necessary to show actualization of shaped and integrated members of metal and resin, explaining structures of the members specifically and also matters as to how one member is connected to another, in what a method they are fixed, etc. in a specified manner, assuming manufacturing floors of factories where parts of automobiles are produced.

Embodiments of the present invention employ the following means in order to solve the above explained problems.

A first embodiment of the present invention are described in the following:
providing an integrated composite article made of a metal and a resin, and a method for using the integrated composite article, in which
forming the integrated composite article by: providing a crystalline thermoplastic resin composition as a resin material, containing: an aliphatic polyamide by 50% to 90% in a resin part and a semi-aromatic polyamide by 50% to 10% in the resin part, and a short glass fiber by 30% to 35% in a total resin composition of the resin material is further provided in the crystalline thermoplastic resin composition; placing a plurality of thin plates of any of Al alloys A5052, A5083, A6061 and A2024 having a thickness of 0.5 mm to 0.9 mm and cut out to be of a suitable rectangular form in a metallic mold for an injection molding, so as to set a position for insertion of each of the plurality of thin plates of any one of Al alloys A5052, A5083, A6061 and A2024;
closing the metallic mold; and
injecting the crystalline thermoplastic resin composition into the metallic mold to form the integrated composite article;
the integrated composite article having a form after demolding such that, each of the plurality of thin plates of any one of Al alloys A5052, A5083, A6061 and A2024 is joined face to face with a molded article of resin mainly in outer peripheral portions thereof, and the molded article of resin having basically a form of a plain plate including curved face portions and having a thickness of 2.5 mm or more and an area of 500 $cm^2$ or more, and,
the integrated composite article being a plate shaped member provided as a roof, a fender, an outer face of a door, a bottom board of a seat, a backboard of a seat, a bottom board of a seat, a backrest of a seat, etc., of a moving machinery including an automobile.

A second embodiment of the present invention is described in the following:
providing an integrated composite article made of a metal and a resin, and a method for using the integrated composite article, in which
forming the integrated composite article by: providing a crystalline thermoplastic resin composition as a resin material, containing: an aliphatic polyamide by 50% to 90% in a resin part and a semi-aromatic polyamide by 50% to 10% in the resin part, and a short glass fiber by 30% to 35% in a total resin composition of the resin material is further provided in the crystalline thermoplastic resin composition; placing at least one of elongated plate of any of Al alloys A5052, A5083, A6061 and A2024 having a thickness of 1.0 mm to 1.5 mm in a metallic mold for an injection molding, so as to set a position for insertion of the at least one of elongated plate of any one of Al alloy s A5052, A5083, A6061 and A2024;

closing the metallic mold; and injecting the crystalline thermoplastic resin composition into the metallic mold to form the integrated composite article;

the integrated composite article having a form such that, the at least one of elongated plate of any one of Al alloys A5052, A5083, A6061 and A2024 is joined face to face with a molded article of resin mainly in a central position thereof for a situation of having one elongated plate or in a parallelized form in an elongated direction for a situation of having a plurality of the elongated plates, the molded article of resin having basically a form of a plain plate and having a thickness of 2.5 mm or more and an area of 400 $cm^2$ or more, and the integrated composite article being a plate shaped member provided as a roof, a fender, an outer face of a door, etc., of a moving machinery including an automobile.

A third embodiment of the present invention is described in the following:

providing an integrated composite article made of a metal and a resin, and a method for using the integrated composite article, in which forming the integrated composite article by: providing a crystalline thermoplastic resin composition as a resin material, containing: an aliphatic polyamide by 50% to 90% in a resin part and a semi-aromatic polyamide by 50% to 10% in the resin part, and a short glass fiber by 30% to 35% in a total resin composition of the resin material is further provided in the crystalline thermoplastic resin composition, placing at least one square bar obtained from any one of Al alloys A5083, A6061 and A2024 or obtained through a machining process of square bar obtained through an extrusion processing of any one of Al alloys A5083, A6061 and A2024 for casting and having been subjected to a heat treatment and having a square of about 5 mm and a length of 100 mm or more in a metallic mold for an injection molding, so as to set a position for insertion of the at least one square bar in a metallic mold, the square bar having been subjected to a chemical treatment of NMT;

closing the metallic mold; and injecting the crystalline thermoplastic resin composition into the metallic mold to form the integrated composite article;

the integrated composite article having a form such that, the square bar is contained to be buried in a molded article of resin basically having a rod-shaped contour with a dimeter of 15 mm to 20 mm and a length of 50 mm to 150 mm in a central position thereof and a substantially whole surface of the square bar is joined with the molded article of resin, and the integrated composite article being provided as a member for a pillar portion of a seat including a driver seat or a passenger seat, of a moving machinery including an automobile.

By replacing current structural articles of steel thin plates with integrated composite plate made of metal and resin which uses a high crystalline thermoplastic resin composition consisting of resin material as a main structural material and a metal material as a supplementary structural material according to embodiments of the present invention, regarding parts other than driving system or chassis such as roof portions, fender portions, outside portions of doors, underside portions of seat, backside portions of seat, etc., of moving machines such as general-purpose automobiles, promotion of lighter weight of automobiles by 10% or more can be attained. This also contributes to "reduction of $CO_2$" in a substantial extent.

BRIEF DESCRIPTION OF THE DRAWINGS

FIG. 8A and FIG. 8B are views schematically showing a shape of an article joined by an injection molding obtained by injecting a particular polyamide resin composition into a metallic mold in which a plurality of Al alloy plate members as metal materials having been subjected to an improved NMT treatment have been inserted.

DESCRIPTION OF EMBODIMENTS

Embodiments of the present invention will be explained in details below.
(High Crystalline Thermoplastic Resin Composition)

At first, characteristics of the high crystalline thermoplastic resin composition, which are important in preparing an integrated composite article made of a metal and a resin of embodiments of the present invention, will be explained. There are one having particular importance and disclosed in Patent Document 3 (JP, Patent Application No. 2007-182071) and Patent document 15 (JP, Patent Publication No. 2022-071227). This is a high crystalline thermoplastic resin composition, for which a resin composition containing a semi-aromatic polyamide constituent as a resin portion by 10% or more, and contains, as other constituents, an aliphatic polyamide constituent of PA6 and PA66 as main constituents, with GF added by 50 mass part to 100 mass part of the resin portion, is used.

Figure 1:
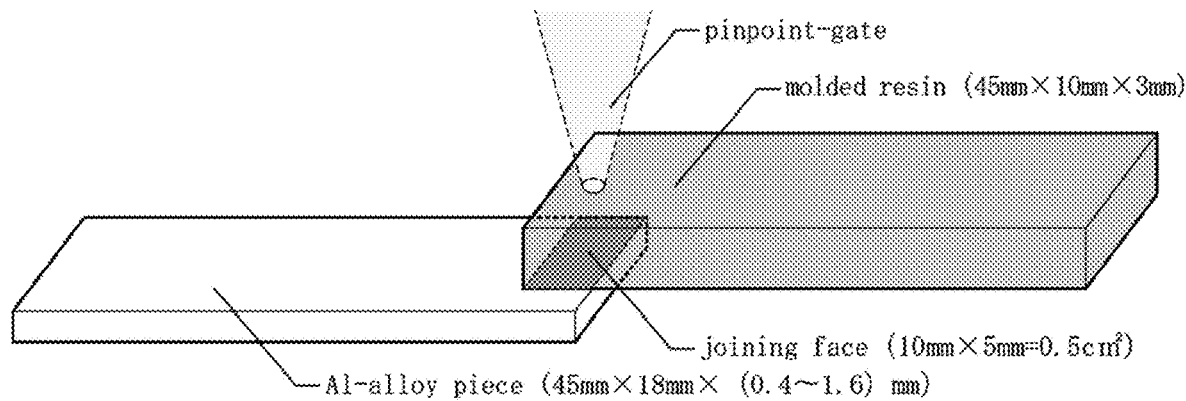
FIG. 1 is a view showing a shape of an integrated article made of a metal and a resin joined integrally by an injection molding as specified in ISO19095 and prepared, in order to measure a shear joining strength between the metal and the resin of the integrated article.

A representative resin of such resin composition is "CM3506G50 (Toray Industries Inc.: main company in Tokyo Japan)". Use of this resin began at a time of remarking it when amazingly high value of shear joining strength as of over 55 MPa was obtained with it from data of shear joining strength of an article joined by injection molding having a shape as shown in FIG. 1, which can be prepared for more than 300 kinds of combinations of nearly 100 kinds of crystalline thermoplastic resins with more than 100 kinds of metal pieces obtainable commonly and treated by chemical treatment method based on techniques of joining by injection molding as NMT, New NMT or SNMT. After that, it was also confirmed that, the resin is excellent in durability of joining strength of an article joined by injection molding over time, durability under high temperature and high humidity circumference, serious durability test under thermal impact between high temperature and low temperature in 3000 cycles, etc., and the resin is satisfactory in physicochemical study as to why it is excellent for such durability test. From these, this resin was selected.

In short, resin containing GF in a large amount as an article formed by injection molding to be a plate material with a thickness of several mm can be one that has strength near to strength of cypress plate, and surface exhibiting either of mirror face feeling or matte face feeling. However, its weakness is such that, its rigidity is inferior as it has lower hardness compared with a thin steel plate or a hard nature wood plate, and also such that, its rigidity is inferior even compared with a plate of lauan timber material. Thus, it is considered that, there is somewhat a problem in low flexural rigidity for a plate material having a large area when used for an outer plate portion of an automobile. Conversely, such a plate material having a small area is durable and can be used sufficiently as an outer plate portion. The reason why such preferable physical property is produced is that, GF by a large amount is contained, and a speed of crystallization when cooled suddenly is rather slow, and therefore, an article formed by injection molding has a clear skin layer, and it is provided with an ability for joining by injection molding with a metal piece having been subjected to a treatment for forming a surface having ultrafine irregularities. While resin "CM3506G50" (made by Toray Industries Inc.) has such characteristics as it is, it has a great meaning that the resin was found out at an early stage of collaborative research by Taisei Plas Co. Ltd. and Toray industries Inc. (Patent Document 2), and further, with improvement of NMT treatment method and SNMT, the highest joining strength by injection molding as of 55 MPa to 60 MPa provided by the resin was attained (Patent Document 15).

The interesting and mysterious physicochemical properties of the polyamide resin composition "CM3506G50" is that, it provides a clear article formed by injection molding while containing GF (short glass fiber) by a large amount of 33.3 mass %. This shows that, the article formed by injection molding has a skin layer containing no GF, which also shows that it is most suitable as a resin for joining by injection molding with a metal material. Then, the reason why a high shear joining strength such as of 55 MPa is created when an excellent article of metal and resin joined by injection molding with newest NMT, New NMT or SNMT as newest technology of joining by injection molding is in that, expressing it with a graph of deformation in elongation of crystallized thermoplastic resin containing GF in a large amount showing relation of tensile strength/strain, the relation goes out of a linear portion beginning from the origin near at a tensile strength of 55 MPa, enters into an area of plastic deformation, then elongation of resin part rises up suddenly and breaking occurs simultaneously at plurality of positions near root on the rein side, thus resulting in fracture as a whole at last.

In short, the upper limit value of extent of invertible tensile deformation of resin portion seems to be near to 55 MPa, and it is considered that, basis for providing such high joining strength consists in GF contained therein by amount of 33.3%. This large amount of contained GF also provides low linear expansion coefficient of the resin composition of about $3\times10^{-5}K^{-1}$ and it supports stability of an article of embodiments of the present invention against change of temperature that the value of linear expansion coefficient of the resin is near to that of Al alloy of $2.4\times10^{-5}K^{-1}$. While it gives curiosity how it becomes when content of the GF increases further to be 35% or 38%, it is sufficient that additional general research is conducted by resin makers, e.g., Toray industries. Inc. when proper research of embodiments of the present invention begins in a manner including producers of automobiles. As explained above, it is known that, when thermoplastic resin composition containing GF by a large amount is joined strongly with a metal piece through techniques of joining by injection molding such as NMT, linear expansion coefficient of the thermoplastic resin itself comes to be near to that of the metal piece, if difference between both linear expansion coefficients is not so large.

In short, material originally having linear expansion coefficient near to $10\times10^{-5}K^{-1}$ as a resin constituent itself come to be a material having that of $3\times10^{-5}K^{-1}$, due to existence of GF having linear expansion coefficient of $0.6\times10^{-5}K^{-1}$ near thereto in a large amount, that is, originally soft resin part is influenced by hard GF to a large extent. This means that, when thermoplastic resin composition is joined with Al alloy having linear expansion coefficient of $2.4\times10^{-5}K^{-1}$ in a manner of complete joining, the resin part that does not insist originally its own linear expansion coefficient strongly comes to have lowered linear expansion coefficient of $2.4\times10^{-5}K^{-1}$, receiving also linear expansion coefficient of Al alloy following to that of GF. In a case where at least a thick plate of Al alloy is joined strongly for face with a resin thick plate of "CM3506G50" by techniques of joining by injection molding to be a composite thick plate, the thick plate never breaks by itself between the two materials of a resin composition and a metal piece self-assertive each other under a thermal impact cycle test with temperature difference of about 150° C.

(Assembling Method of a Body of an Automobile as an Important Matter for Implementing Embodiments of the Present Invention)

Considering that members for a moving machinery of embodiments of the present invention is to be applied to roofs, fenders, outside faces of doors, seat bases, backrest of seats, etc., specific techniques of assembling and an assembling method for incorporating the articles of embodiments of the present invention into an automobile for accomplishing thereof is not well known to the present inventor. When the present inventor visited a company producing automobiles for inspecting, it was explained, regarding a process attaching fenders made of resin to bodies, that there is much pain as misalignment holes becomes large in summer. While, hearing this, it was thought that it was of screwing or hooking, it was not understood as it was not permitted to see the operation of the process itself. If it is not a simple screwing, it may be such that after a fender having a form of outer peripheral portion for insertion itself is inserted screwing is performed at several positions. It is considered whether adhesive is used or not. Anyway, it is proper techniques for a producer of automobiles to select of such a final connecting method, implementing tests and unify it. Although it was thought whether there is a way to help this, this is a matter that can never be attained by a person other than technicians who knows production site, just a matter for a producer of automobiles with history.

When the above resin "CM3506G50" or improved resin composition with shape (length of short fiber) of GF or content in total resin composition adjusted is used, it is considered that, fixing to steel frame portion by screwing will be securely performed with a thick plate piece of Al alloy having a thickness of 1 mm placed at an outer peripheral portion of an article joined by injection molding as such portion composes a composite plate of Al alloy and high strength resin. Such articles according to embodiments of the present invention are shown in FIGS. 4A to 4C, FIGS. 5A to 5C, and FIGS. 7A and 7B.

(Techniques Specifically Used in Embodiments of the Present Invention)

Resin composition of "CM3506G50" or another polyamide resin composition selected out under a condition of crystalline thermoplastic resin containing aliphatic polyamide by 50 mass % to 90 mass % of resin part and semi-aromatic polyamide by 50 mass % to 10 mass % of resin part and further containing short glass fiber by 30 mass % to 35 mass % of total mass is used as a resin to be injected. On the other hand, while chemical treatment of a type of NMT, New NMT or SNMT is applied to a metal or metal alloy, these chemical treatment methods have been improved from that of initial method to one at present with actual operation changing as time elapses. Clearest of these is treatment method of NMT, for which name of treatment method is changed as follows, thus enabling to know which level of NMT treatment has been specifically performed. That is, this concerns a sequence such that NMT treatment→NMT2 treatment→NMT 5 treatment→NMT 7 treatment→NMT 8 treatment. While there are about 20 kinds of Al alloys for frequently used Al alloys in JIS and, with first NMT treatment method, same treatment method is applied to all kinds of Al alloys, different treatment methods different from each other are used according to each kind of Al alloy after NMT 2 treatment method. Al alloy treatment method used in embodiments of the present invention is a treatment method of NMT 5 or NMT 8.

New NMT treatment method is a treatment method for each metal or metal alloy of non-aluminum metal materials and, as a natural matter, specific treatment method for each metal or metal alloy is quite different since beginning of development thereof. Of course, as newer the treatment method is, the more it is improved, and list of record thereof is reserved in the company (Taisei Plas Co. Ltd.). But specific names are not assigned thereto. Further to say, while SNMT treatment method is also improved for each kind of metal or metal alloy, name therefor is not assigned. Chemical treatment method for several kinds of Al alloys will be explained in details in the explanation of Embodiments.

(Regarding Operation of Joining by Injection Molding and Annealing Treatment)

Operation of joining by injection molding merely such as of preparing a metallic mold for joining by injection molding, inserting a metal piece (metal pieces) into the opened metallic mold, closing the metallic mold and injecting resin, which is similar to operation of injection molding, so there are no techniques, etc., particularly to be explained. Daring to say for this, there are matters of temperature of a metallic mold and pressure retention time. Temperature of a metallic mold is basically preset to be somewhat high, though there is a range recommended by the producer. Specifically, when resin "CM3506G50" is used, temperature of a metallic mold near to 140° C. is preferable. In a case where a piece to be inserted is a large one of 1 kg or more, it is necessary to begin operation of injection of resin waiting for 30 seconds to 90 seconds after the piece is inserted and the metallic mold is closed, judging the time when temperature of the inserted piece becomes substantially same as temperature of the metallic mold, without beginning operation instantly after the metallic mold has been closed. The reason for this is same as that for presetting temperature of the metallic mold. Regarding pressure retention time after then, it was thought as preferable to preset time from beginning of injection to end of pressure retention to be about 30 seconds, as it seems that speed of crystallization of "CN3506G50" when suddenly cooled is slow.

Of course, it is not that the obtained article joined by injection molding is cooled as it is to be a final article, but heating treatment (annealing treatment) of (150° C. to 170° C.)×1 hour within several hours is performed to promote crystallization of the resin sufficiently, thus completing total steps of process of joining by injection molding. While the article joined by injection molding should be obtained with time from beginning of injection to end of pressure retention preset to be near to 30 seconds as above explained, annealing treatment is performed for the article joined by injection molding after it has been treated so.

(Measurement of Shear Joining Strength)

Figure 2:
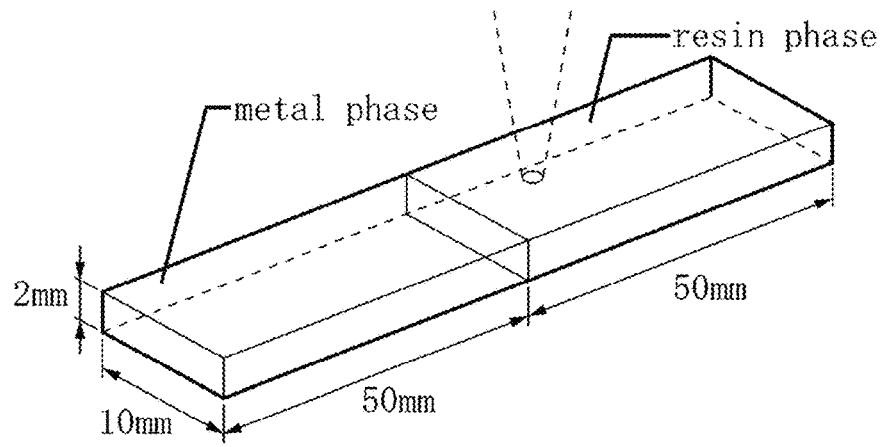
FIG. 2 is a view showing a shape of an integrated article made of a metal and a resin joined integrally by an injection molding as specified in ISO19095 and prepared, in order to measure a tensile joining strength between the metal and the resin of the integrated article.

Method for measuring shear joining strength and tensile joining strength between metal part and molded resin part in an article joined by injection molding is defined in ISO19095, which discloses method for measuring shear joining strength of a shaped article shown in FIG. 1 through shear breaking thereof with a tensile testing machine and method for measuring tensile joining strength of a shaped article shown in FIG. 2 through tensile breaking thereof with tensile testing machine. The method for measuring shear joining strength using the shaped article shown in FIG. 1 is one the present inventor, etc., used in all of Patent Documents 1 to 17, and the method for measuring tensile joining strength using the shaped article shown in FIG. 2 is one the present inventors, etc., began to use in 2015 or so in various circumstances. Either of them cannot be measured by the method defined in JISK6849 or JISK6850 as conventional measurement of adhering strength or joining strength, and so the present applicant (Taisei Plas Co. Ltd.) proposed a new definition, which was recognized as ISO19095 through examination in the Japanese official organ and examination in each official organ concerning ISO.

(Article Joined by Injection Molding Bearing Thermal Impact Cycle Test)

Automobiles are used all around the world. They are used also in Alaska or in districts of tropical desert and temperature in use thereof ranges from −50° C. to +50° C. Further to say, temperature of parts around the engines or lamps in driving may rise up to +150° C. irrespectively of seasons, summer or winter, and it may become +30° C. in driving also indoor in cold regions. Most serious thermal impact cycle, occurring in winter in Alaska, Russia or northern Europe, seems to be thermal impact of about −50° C./+150° C. with 300 cycles/year for parts around engines of engine automobiles. As such, it is understood that test under thermal impact of −50° C./+150° C. with 3000 cycles is employed as endurance test for automobiles, supposing they are used for 10 years. Also, the articles of embodiments of the present invention were evaluated with this thermal impact cycle test (1000 cycles to 3000 cycles).

This test under thermal impact of −50° C./+150° C. with 3000 cycles was performed at first for articles joined by injection molding of PPS resin "SGX120" (produced by Toso Co. Ltd., main company in Tokyo, Japan; different from articles of embodiments of the present invention) with various kinds of metal pieces, all of which exhibit shear joining strength of 40 MPa to 42 MPa, as the present inventor understood to be so to say "complete joined articles". Then, the first matter to do was to prepare a shaped article thereof shown in FIG. 1. As specific polyamide resin composition "CM3506G50" is used in the article of the present invention and the obtained article joined by injection molding with a metal piece has a shear joining strength near to 55 mPa, it seems that this shear joining strength of about 40 MPa with the article joined by injection molding using "SGX120" is somewhat low. In this, if both articles are of complete joined articles, joining strength thereof varies corresponding to how much reinforcing fiber GF is contained in the resin composition, thus such difference is created between "SGX120" containing GF by about 20% and "CM3506G50" containing GF by about 33%. In short, reason for shear breaking of a complete joined article under tensile test consists in that, when load on the article go over the strength, elastic deformation (reversible deformation) of either of the two materials becomes impossible, thus being transferred to plastic deformation (non-reversible deformation), small breaking occurs near to the joining face on the side of the material having created plastic deformation, as a natural matter, and stress concentration is generated around there, thus resulting in breaking as a whole.

As metal material is generally harder than resin material, breaking occurs on the side of resin material commonly. As such, if an article joined by injection molding is a complete joined article, irrespective metal side being of Al alloy, steel, copper or Ti, the article breaks down exhibiting shear joining strength of about 40 MPa when used resin is "SGX120" and exhibiting shear joining strength of 55 MPa when used resin is "CM3506G50". There are some cases of articles joined by injection molding with such expectation is not applicable at all. These are cases of articles in which metal material is a soft metal material such as Al alloy A1050 being near to a pure metal rather than an alloy. That is, such cases correspond to ones of articles joined by injection molding in which metal materials able to change from elastic deformation to plastic deformation under tensile braking test earlier than resin materials are used. In cases of articles joined by injection molding in which Al alloys of A1085, A1080, A1050, etc., are used as metal materials and the metal materials are completely joined with resin material of "SGX120" or "CM3506G50", shear joining strength thereof is 35 to 38 MPa, and shear joining strength of 40 MPa or more is not observed. This is caused by a situation that plastic deformation on the side of metal material begins at this tensile strength.

Returning to the above, matters disclosed in Patent Document 14 will be explained again below. At first, 30 articles joined by injection molding having a shape as shown in FIG. 1 with PPS resin composition "SGX120" used are prepared. In the next, performing mechanical grinding on resin portions (having initial thickness of 3 mm) of some of the shaped articles shown in FIG. 1 to prepare articles with thickness of resin portion of 2 mm, and, further grinding them, to prepare articles with thickness of resin portion of 1 mm. As a result, 10 articles shown in FIG. 1 are left as they are, 10 articles with only thickness of resin being 2 mm are prepared, and 10 articles with only thickness of resin being 1 mm are prepared. Added to this, total of the 30 articles are coated with anti-rust paint and baked at a temperature of 100° C. Then, they are subjected to test of thermal impact of −50° C./+150° C. with 2000 cycles and further left under an ordinary temperature for a week, after which they are broken at the joining face.

It is only for the articles having thickness of resin part of 3 mm that breaking with a tensile testing machine is performed and shear joining strength is measured by a method defined in ISO19096, and the other articles are broken using a tool such as a nipper, as they could not be broken at the joining portion thereof under a tensile testing machine. Regarding method of evaluation, while shear joining strength is obtained for articles shaped as shown in FIG. 1 so as to be evaluated instantly, the other articles are evaluated through observation of traces of joining faces of the obtained metal pieces. That is, as the resin "SGX120" used in joining by injection molding has been blackened with carbon black, colored resin powder attaches to the traces of joining faces on the metal side after breaking. As parts that resin powder does not attach to are ones where resin portion is pulled out of fine concaves on the metal face with joining strength lowered due to the thermal impact test, joining strength became zero at such parts, if they exist, without blackened resin powder attaching to. Understanding in such a manner, it can be understood also regarding parts where joining strength is lost due to thermal impact and parts where joining strength is reserved.

While this thermal impact test with 2000 cycles is performed for shaped articles as shown in FIG. 1 in which the metal material has a thickness of 3 mm to 6 mm (thickness of 3 mm or more for a steel material or hard Al alloy material; thickness of 4.5 mm to 6 mm for a soft Al alloy material), difference between linear expansion coefficients of the two materials causes damage on the joining face as it is when thermal impact is given so many times. With articles in which resin material is so thin to be flexibly contract and expand, joining face portion thereof is not easily subjected to damage. In fact, with articles in which resin material has a thickness of 3 mm (an article joined by injection molding shown in FIG. 1), shear joining strength thereof decreases for all of them, though there is dispersion therein. Thus, with articles in which both materials are thick and sturdy, complete joining face is clearly reduced through repeated thermal impact. Adversely, with materials having a thickness of resin material of 1 mm, no damage occurs for Al alloy, a little seemingly peeled sites are observed at 1 or 2 corners of trace of joining face for SUS 304 steel, and a little peeling is observed at two corners of trace of joining face for Ti alloy. With articles having a thickness of resin material of 2 mm, larger or smaller peeling is observed at any of two corners and four corners of traces of joining face, which appears to be an intermediate between the articles having a thickness of 3 mm and the articles having a thickness of 1 mm. As a result, it can be seen that, even if Al alloy as a metal material is thick one, the composite article in which resin material has a thickness of about 1 mm is durable under thermal impact, and adversely thereto, if resin material has a thickness of 3 mm, the completely joined article in which metal material is thin is durable under thermal impact.

Here, returning to the article joined by injection molding using resin "CM3506G50" again, when articles joined by injection molding in a shape shown in FIG. 1 are prepared using thick plate material of Al alloy A5052, Al alloy A5082 or Al alloy A6061 with resin material "CM3506G50" and the articles are subjected to test of thermal impact of −50° C./+150° C. with several thousand cycles to measure joining strength between the metal material and resin material, there appears problems as to whether, if thickness of resin material occupying the widest joining area is 1 mm in a similar manner as in the above case of resin material "SGX120", also the article using "CM3506G50" is not affected negatively at all and whether design policy of articles joined by injection molding that can endure the severe test of thermal impact with several thousand cycles is same as one shown in attached drawings of Patent Document 14 or not. Here, kind of used resin is different and physical property of the resin composition thereof is also different. Such an irresponsible conclusion should not be issued that, irrespective of the difference of kind of resin, the articles joined by injection molding in which resin material has thickness of 1 mm will endure the same test of thermal impact with high cycles.

However, if result is to be obtained through quite same method of experiment when resin material is changed from "SGX120" to "CM3506G50", there is so much waste. Here, such conclusions have been acquired that, regarding experimental test of an article using "SGX120" and metal material of Al alloy (having linear expansion coefficient of $2.4 \times 10^{-5} K^{-1}$), the article with thin resin material having a thickness of about 1 mm can endure thermal impact even if the metal material is thick one, and adversely thereto that an article completely joined by injection molding and having resin material with thickness of 3 mm can endure thermal impact by causing metal material to be thin. Therefore, part to be corrected in the above sentence following to "when resin material is changed from "SGX120" to "CM3506G50" is the part of "a thickness of about 1 mm" in the sentence "metal material of Al alloy, the article with thin resin material having a thickness of about 1 mm can endure thermal impact even if the metal material is thick one", that is, it regards as to whether the part is 1.2 mm, 1.0 mm or 0.8 mm. With this, without getting conclusion after preparing many articles having a shape shown in FIG. 1 and performing troublesome experiments repeatedly, articles available for use can be found out at a time by preparing a metallic mold for a final article at first so as to be adapted to form final article joined by injection molding with any thickness of 1.2 mm, 1.0 mm or 0.8 mm for issue, conducting joining by injection molding for each of the three kinds of final articles by several numbers thereof and causing all of these to be subjected to thermal impact with several thousand cycles. Anyway, it is a merit of techniques of joining by injection molding that shape of a metallic mold can be easily changed by forming the metallic mold to be of a nested structure and inserting or extracting a spacer. Understanding the logic, inspection or test of the articles can be simplified.

EXPERIMENT EXAMPLES

Experiment examples and methods of evaluation and measurement of articles joined by injection molding obtained in the experimental examples according to embodiments of the present invention will be explained in details below.

Figure 3:
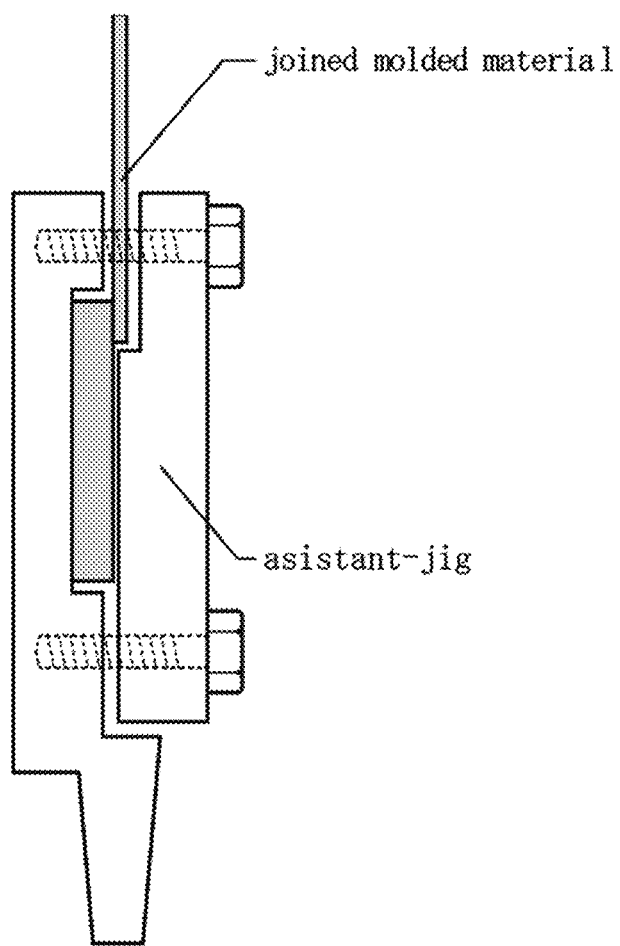
FIG. 3 is a view showing a shape of an assistant-jig used for measuring a shear joining strength of the integrated article made of a metal and a resin as specified in ISO19095.

Breaking force at a time when an article joined by injection molding (as shown in FIG. 1 or FIG. 2) is tensile broken with a tensile test machine for measuring joining strength was taken as joining strength (shear joining strength, tensile joining strength). In this, an assistant-jig shown in FIG. 3 was used for measurement of shear joining strength. A tensile test machine AG-500N/1 kN (manufactured by Shimadzu-seisakusho Co. Ltd.) was used for tensile test, and measurement was conducted at a tension speed of 1 mm/min. This method of measurement is according to ISO 19095.

Experiment Example 1

(NMT 8 Treatment of Al Alloy A5052)

Multitude of rectangular pieces of aluminum alloy with a size of 18 mm×45 mm×1.5 mm were obtained from commercially available plates of aluminum alloy (A5052) through mechanical working. An aqueous solution containing degreaser for aluminum "NA-6" by 10% was filled to be at 60° C. in a tank, in which the above aluminum alloy pieces were immersed for 5 minutes, and after then the pieces were rinsed with tap water (Ota city, Gumma prefecture, Japan). Next, an aqueous solution of caustic soda in a concentration of 10% set to be at 40° C. was made ready in another tank, in which the pieces were immersed for 1 minute, and after then the pieces were rinsed with water. Next, an aqueous solution containing aluminum chloride hydrate in concentration of 1% and hydrochloric acid in a concentration of 5% set to be 40° C. was made ready in still another tank, in which the pieces were immersed for 6 minutes, and after then the pieces were rinsed with water. Next, an aqueous solution containing ammonium-hydrogendifluoride in a concentration of 2% and sulfuric acid in a concentration of 10% set to be 40° C. were made ready in still another tank, in which the pieces were immersed for 4 minutes, and after then the pieces were rinsed with water.

Next, an aqueous solution of caustic soda in a concentration of 1.5% was made ready to be at 40° C. in still another tank, in which the pieces were immersed for 1 minute, and next, an aqueous solution of nitric acid in a concentration of 3% was made ready to be at 40° C. in still another tank, in which the pieces were immersed for 1.5 minute, and after then the pieces were rinsed with water. Next, an aqueous solution of hydrazine hydrate in a concentration of 3.5% was made ready to be at 60° C. in still another tank, in which the pieces were immersed for 1 minute, and next, an aqueous solution of hydrazine hydrate in a concentration of 0.5% was made ready to be at 33° C. in still another tank, in which the pieces were immersed for 6 minutes, and after then the pieces were rinsed with water. Next, the pieces were immersed in an aqueous solution of hydrogen peroxide in a concentration of 0.5% for 1 minute, then immersed in an aqueous solution of triethanolamine in a concentration of 0.2% for 5 minutes. After then, the pieces were rinsed, not with pure water, but with an aqueous solution of triethanolamine in a concentration of 25 ppm. Thus obtained alloy pieces were placed in a warm air drier set to be 67° C. for 15 minutes to be dried, after which the pieces were wrapped with aluminum foil and stored.

Experiment Example 2

(NMT 8 Treatment of Al Alloy A6061)

Pieces of aluminum alloy A6061 with a size of 18 mm×45 mm×1.5 mm were obtained. An aqueous solution containing degreaser for aluminum "NA-6" by 10% was filled to be at 60° C. in a tank, in which the above aluminum alloy pieces were immersed for 5 minutes, and after then the pieces were rinsed with tap water (Ota city, Gumma prefecture, Japan). Next, an aqueous solution of caustic soda in a concentration of 10% set to be at 40° C. was made ready in another tank, in which the pieces were immersed for 1 minute, and after then the pieces were rinsed with water. Next, an aqueous solution containing aluminum chloride hydrate in concentration of 1% and hydrochloric acid in a concentration of 5% set to be 40° C. was made ready in still another tank, in which the pieces immersed for 1 minute, and after then the pieces were rinsed with water. Next, an aqueous solution containing ammonium-hydrogendifluoride in a concentration of 2% and sulfuric acid in a concentration of 10% set to be 40° C. were made ready in still another tank, in which the pieces were immersed for 1 minute, and after then the pieces were rinsed with water.

Next, an aqueous solution of caustic soda in a concentration of 1.5% was made ready to be at 40° C. in still another tank, in which the pieces were immersed for 2 minutes, and next, an aqueous solution of nitric acid in a concentration of 3% was made ready to be at 40° C. in still another tank, in which the pieces were immersed for 1.5 minute, and after then the pieces were rinsed with water. Next, an aqueous solution of hydrazine hydrate in a concentration of 3.5% was made ready to be at 60° C. in still another tank, in which the pieces were immersed for 1 minute, and next, an aqueous solution of hydrazine hydrate in a concentration of 0.5% was made ready to be at 33° C. in still another tank, in which the pieces were immersed for 4.5 minutes, and after then the pieces were rinsed with water. Next, the pieces were immersed in an aqueous solution of hydrogen peroxide in a concentration of 0.5% for 1 minute, then immersed in an aqueous solution of triethanolamine in a concentration of 0.2% for 5 minutes. After then, the pieces were rinsed, not with pure water, but with an aqueous solution of triethanolamine in a concentration of 25 ppm. Thus obtained alloy pieces were placed in a warm air drier set to be 67° C. for 15 minutes to be dried, after which the pieces were wrapped with aluminum foil and stored.

Experiment Example 3

(NMT 8 Treatment of Al Alloy A2024)

Pieces of aluminum alloy A2024 with a size of 18 mm×45 mm×1.5 mm were obtained. An aqueous solution containing degreaser for aluminum "NA-6" by 10% was filled to be at 60° C. in a tank, in which the above aluminum alloy pieces were immersed for 5 minutes, and after then the pieces were rinsed with tap water (Ota city, Gumma prefecture, Japan). Next, an aqueous solution of caustic soda in a concentration of 10% set to be at 40° C. was made ready in another tank, in which the pieces were immersed for 1 minute, and after then the pieces were rinsed with water. Next, an aqueous solution containing aluminum chloride hydrate in concentration of 1% and hydrochloric acid in a concentration of 5% set to be 40° C. was made ready in still another tank, in which the pieces immersed for 1 minute, and after then the pieces were rinsed with water. Next, an aqueous solution containing ammonium-hydrogendifluoride in a concentration of 2% and sulfuric acid in a concentration of 10% set to be 40° C. were made ready in still another tank, in which the pieces were immersed for 3 minutes, and after then the pieces were rinsed with water.

An aqueous solution of caustic soda in a concentration of 1.5% was made ready to be at 40° C. in still another tank, in which the pieces were immersed for 2 minutes, and next, an aqueous solution of nitric acid in a concentration of 3% was made ready to be at 40° C. in still another tank, in which the pieces were immersed for 2.5 minute, and after then the pieces were rinsed with water. Next, an aqueous solution of hydrazine hydrate in a concentration of 3.5% was made ready to be at 60° C. in still another tank, in which the pieces were immersed for 1 minute, and next, an aqueous solution of hydrazine hydrate in a concentration of 0.5% was made ready to be at 33° C. in still another tank, in which the pieces were immersed for 3 minutes, and after then the pieces were rinsed with water. Next, the pieces were immersed in an aqueous solution of hydrogen peroxide in a concentration of 0.5% for 1 minute, then immersed in an aqueous solution of triethanolamine in a concentration of 0.2% for 4 minutes. After then, the pieces were rinsed, not with pure water, but with an aqueous solution of triethanolamine in a concentration of 25 ppm. Thus obtained alloy pieces were placed in a warm air drier set to be 67° C. for 15 minutes to be dried, after which the pieces were wrapped with aluminum foil and stored.

Experiment Example 4

(NMT 5 Treatment of Al Alloy ADC12)

Multitude of pieces of aluminum alloy ADC12 with a size of 18 mm×45 mm×1.5 mm were obtained, placing an order to related company. An aqueous solution containing degreaser for aluminum "NA-6" by 10% was filled to be at 60° C. in a tank, in which the above aluminum alloy pieces were immersed for 5 minutes, and after then the pieces were rinsed with tap water (Ota city, Gumma prefecture, Japan). Next, an aqueous solution of caustic soda in a concentration of 1.5% set to be at 40° C. was made ready in another tank, in which the pieces were immersed for 4 minutes, and next, aqueous solution of nitric acid in a concentration of 3% was made ready to be at 40° C. in still another tank, in which the pieces were immersed for 2 minutes, and after then the pieces were rinsed with water. Next, the pieces were immersed in a tank provided with a supersonic transmission end and filled with water for 5 minutes to be washed. Next, an aqueous solution of hydrazine hydrate in a concentration of 3.5% was made ready to be at 60° C. in still another tank, in which the pieces were immersed for 1 minute, and then the pieces were immersed in a tank provided with a supersonic transmission end and filled with water for 5 minutes to be washed again. Next, an aqueous solution of hydrazine hydrate in a concentration of 0.5% was made ready to be at 33° C. in still another tank, in which the pieces were immersed for 1 minute, and then the pieces were immersed in a tank provided with a supersonic transmission end and filled with water for 5 minutes to be washed again. Thus obtained alloy pieces were placed in a warm air drier set to be 67° C. for 15 minutes to be dried, after which the pieces were wrapped with aluminum foil and stored.

Experiment Example 5

Preparation of Articles Joined by Injection Molding and Measurement of Joining Strength Thereof Each of the Al alloy pieces having been subjected to surface treatment obtained in Experiment Examples 1 to 4 was inserted into a metallic mold for injection molding and then polyamide resin "CM3506G50" for joining by injection molding was injected into the metallic mold, with which articles joined by injection molding in a form shown in FIG. 1 were obtained. In this, temperature of injected resin was 300° C. and temperature of the metallic mold was 140° C. Thus obtained articles joined by injection molding were placed in a hot air dryer set to be 170° C. for an hour to be annealed. Shear joining strength of the obtained articles joined by injection molding at a temperature of 23° C. is shown in Table 1. Method of measurement is according to ISO19095 and was implemented such that each article shaped as shown in FIG. 1 was attached to an assistant-jig shown in FIG. 3 and was subjected to test under a tensile test machine at a temperature of 23° C. Each value of shear joining strength as result is a mean value of values for three articles.

TABLE 1

Shear joining strength of an article joined by injection molding using "CM3506G50"

| Al metal-alloy | Surface treatment method | Shear joining strength |
| --- | --- | --- |
| A5052 | NMT8 | 282 Kg/0.5 cm$^2$ (55.2 MPa) |
| A6061 | NMT8 | 261 Kg/0.5 cm$^2$ (51.1 MPa) |
| A2024 | NMT8 | 278 Kg/0.5 cm$^2$ (54.5 MPa) |
| ADC12 | NMT5 | 272 Kg/0.5 cm$^2$ (53.3 MPa) |

[Examples of Shapes of Obtained Articles Joined by Injection Molding and Characteristics Thereof]
[Example of Shape 1]
(Example of Shape of Plate Shaped Member for Roof Part of Automobile)

Figure 4A:
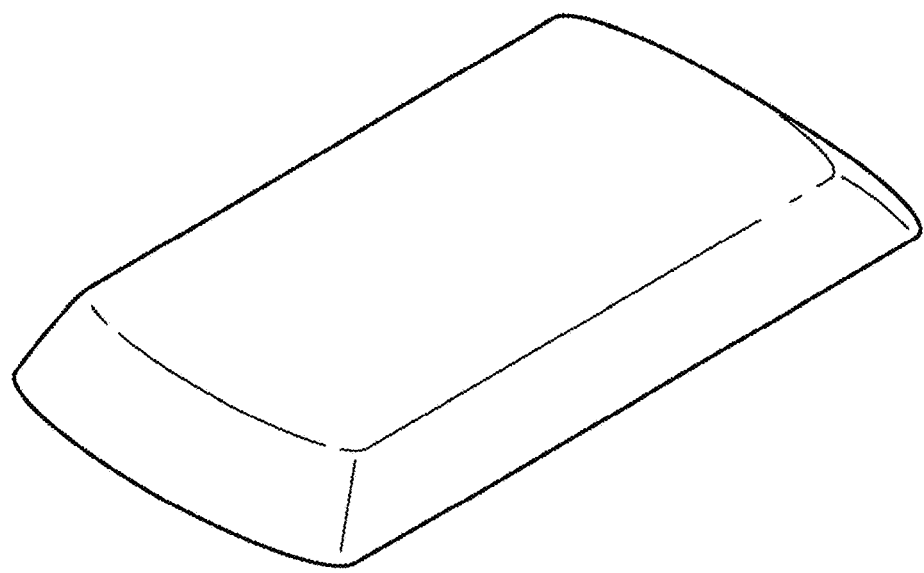
FIG. 4A to FIG. 4C are views schematically showing a shape of an article joined by an injection molding obtained by injecting a particular polyamide resin composition into a metallic mold in which a plurality of Al alloy plate members as metal materials having been subjected to an improved NMT treatment have been inserted.
Figure 4B:
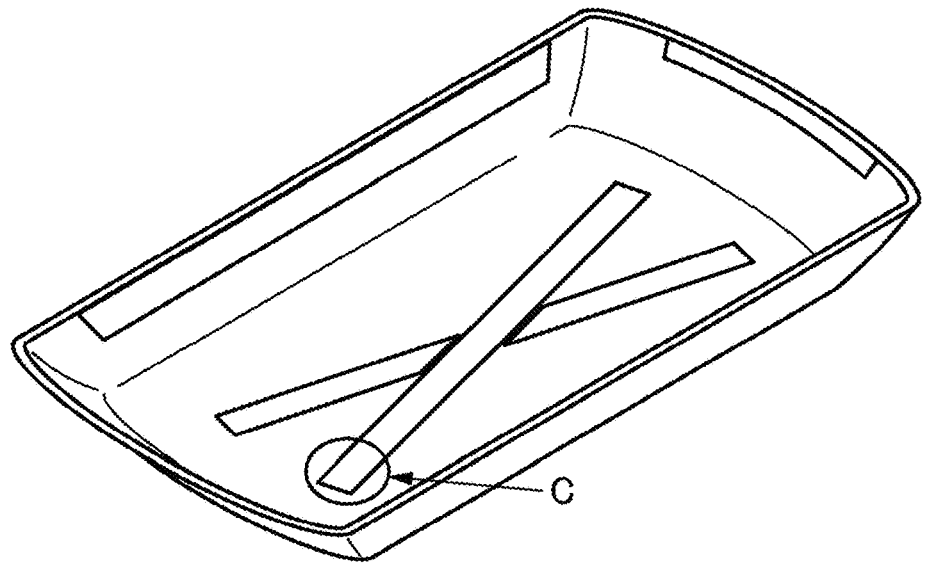
Figure 4C:
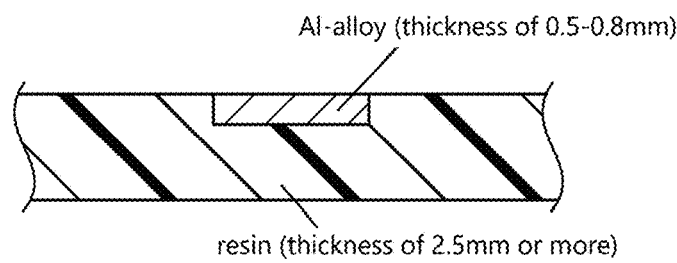

A plate shaped member shown in FIGS. 4A to 4C is a plain plate member basically made of resin having a plate shape with curved portion and having a thickness of 2.5 mm or more as a whole. This plate member is formed as an article joined by injection molding by placing plurality of Al alloy plate pieces in a metallic mold for injection molding at positions to be in peripheral positions of the plate shaped member shown in FIGS. 4A to 4C and by conducting injection molding as it is to form the shaped article, so as to align this plate shaped member for roof part shown in FIGS. 4A to 4C exactly within a frame of a cabin structure made of steel or cast Al alloy by extrusion process. Thickness of the small pieces of Al alloy is 0.5 to 0.8 mm and it seems that screwing with the metal frames can be conducted to be sufficiently firm with increasing number thereof. Also regarding other method by adhesion, method by adhesion+ screwing, etc., a member of plural layers including Al alloy will be better than a single member of Al alloy.
[Example of Shape 2]
(Example of Shape of Plate Shaped Member for Roof Part of Automobile)

Figure 5A:
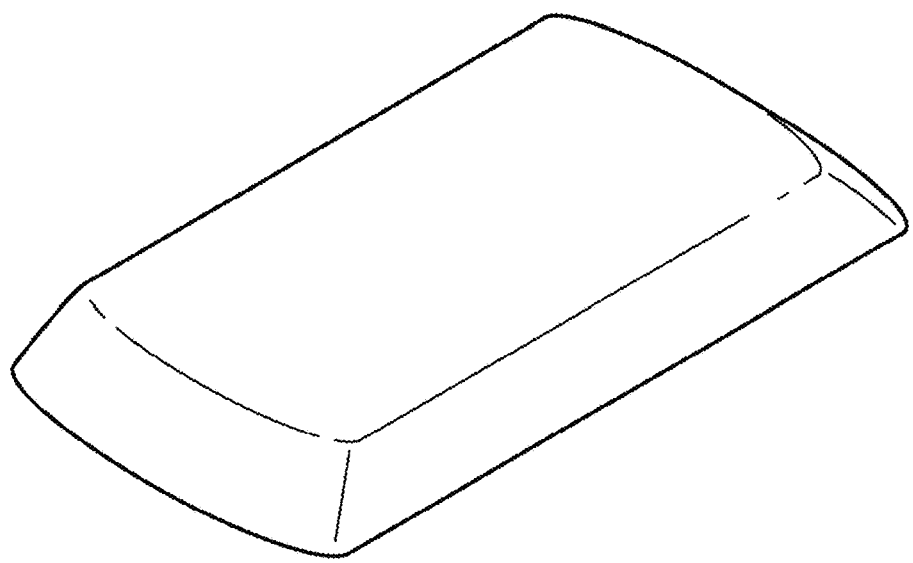
FIG. 5A to FIG. 5C are views schematically showing a shape of an article joined by an injection molding obtained by injecting a particular polyamide resin composition into a metallic mold in which a plurality of Al alloy plate members as metal materials having been subjected to an improved NMT treatment have been inserted.
Figure 5B:
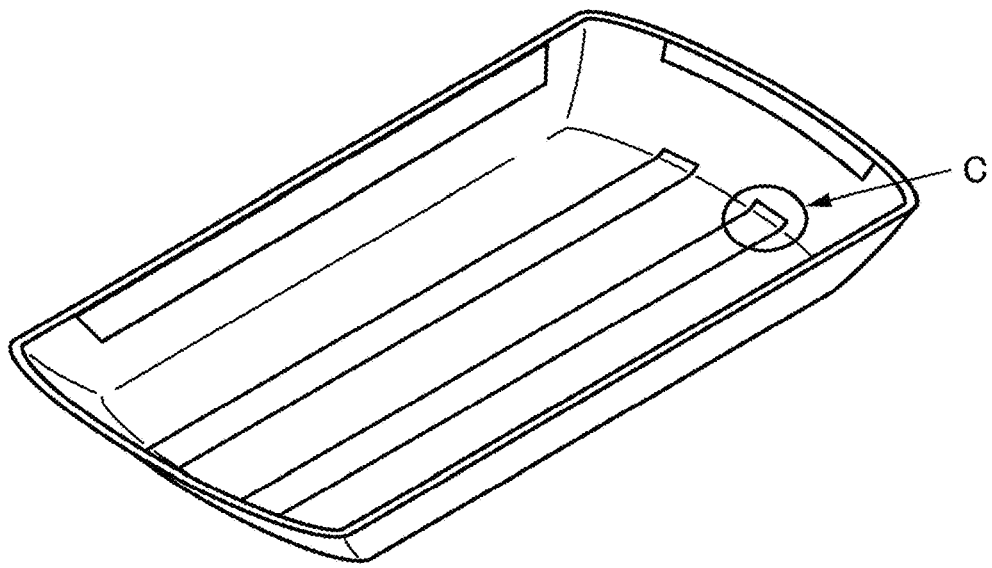
Figure 5C:
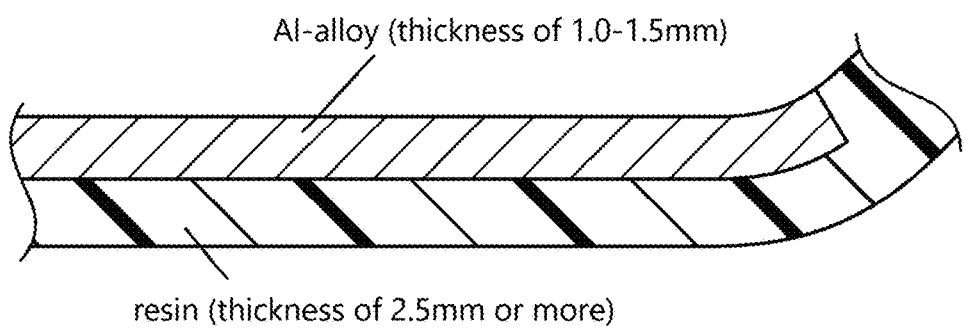

A plate shaped member shown in FIGS. 5A to 5C is one using two backbone members for a roof part, causing cabin structure to be firmer in addition to Example of shape 1. Plates cut out from a thick plate having a thickness of 1 mm of Al alloy A6061 or A2024 may be used as an Al alloy part for strengthening backbone portion in a so-called mass production SUV with a high cabin room, in order to endure rough roads.
[Example of Shape 3]
(Example of Shape for Side Fender)

Figure 6A:
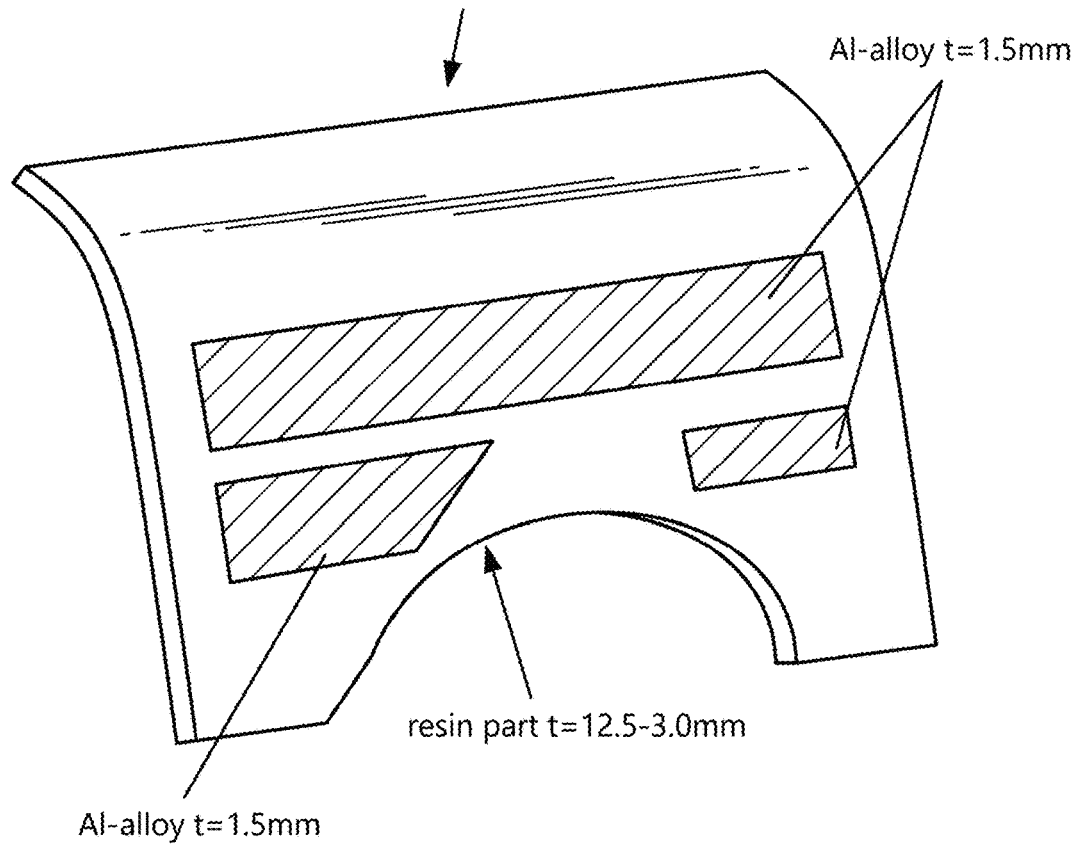
FIG. 6A and FIG. 6B are views schematically showing a shape of an article joined by an injection molding obtained by injecting a particular polyamide resin composition into a metallic mold in which a plurality of Al alloy plate members as metal materials having been subjected to an improved NMT treatment have been inserted.
Figure 6B:
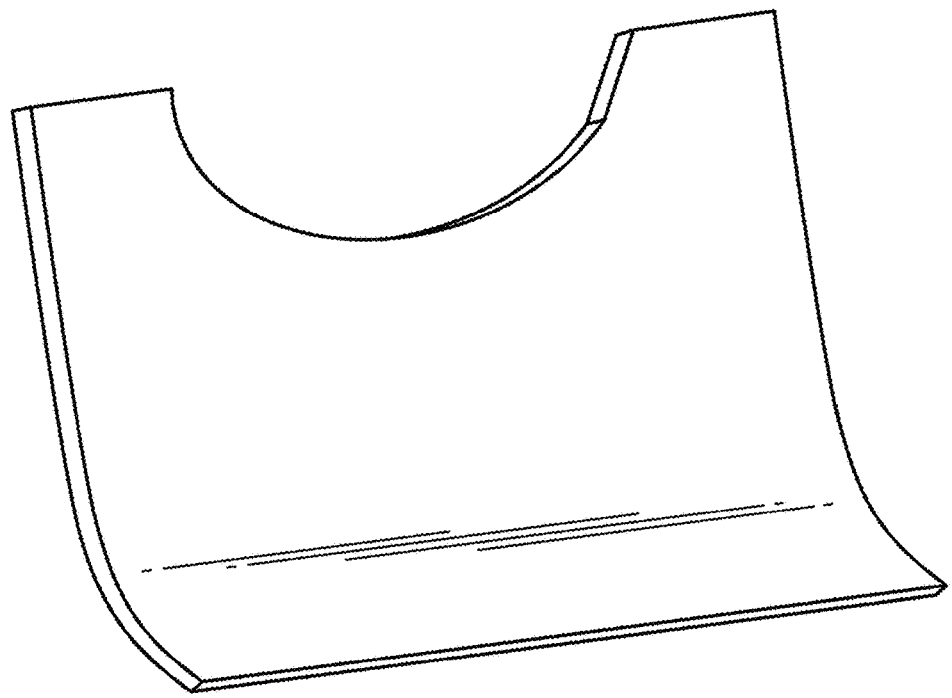

A plate shaped member shown in FIGS. 6A and 6B is a plate member basically made of resin having a plate shape with curved portion and having a thickness of 2.5 mm or more as a whole, and has elongated firm plate(s) made of Al alloy having a thickness of 1.5 mm is/are attached to in lengthwise direction for shape maintenance in a front and side face of an automobile. This will be favorable for SUV, though it seems to be not necessary for common vehicles.
[Example of Shape 4]
(Example of Shape for Side Door)

Figure 7A:
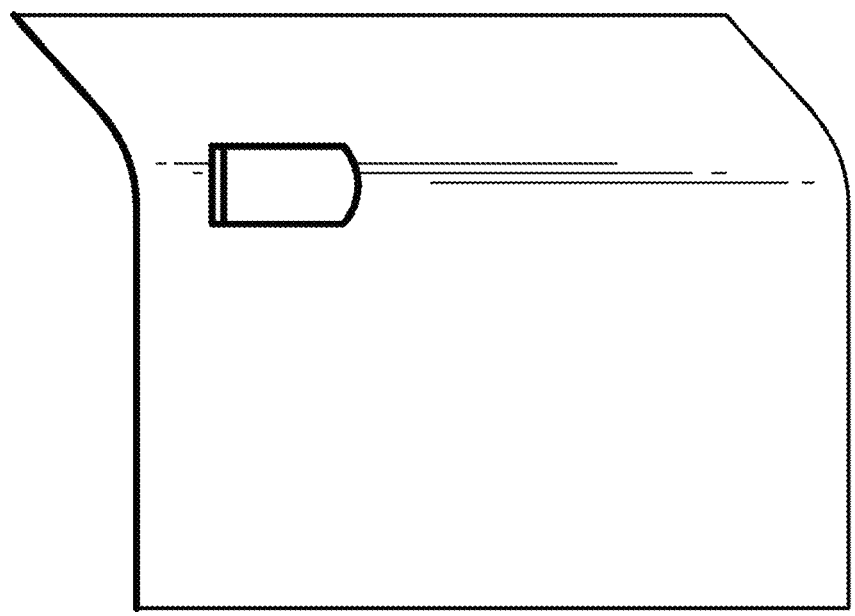
FIG. 7A and FIG. 7B are views schematically showing a shape of an article joined by an injection molding obtained by injecting a particular polyamide resin composition into a metallic mold in which a plurality of Al alloy plate members as metal materials having been subjected to an improved NMT treatment have been inserted.
Figure 7B:
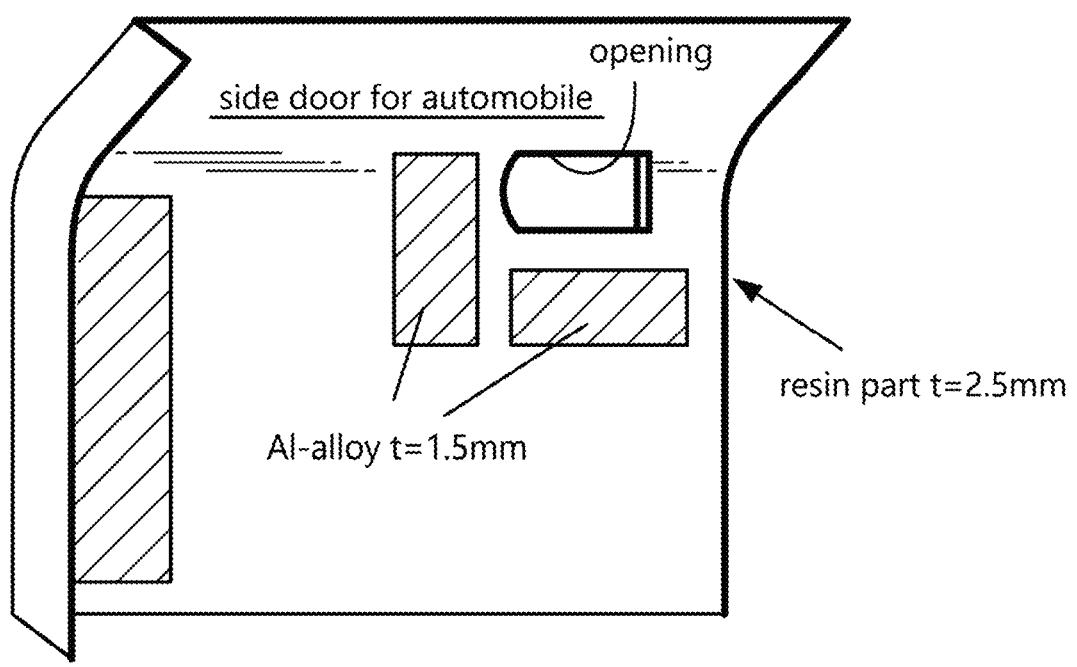

A plate shaped member shown in FIGS. 7A and 7B is a plate member basically made of resin having a plate shape with curved portion and having a thickness of 2.5 mm or more as a whole, and structure of door itself is supposed to be one in which the door plate shown in FIGS. 7A and 7B is attached to a structure of steel frame. While the door plate is fixed to the steel frame, plate members of Al alloy having a thickness of 1.5 mm are disposed in base positions for rotation of the door so as not to create shape misalignment when the door is opened or closed. Portions near to door knob is strengthened.
[Example of Shape 5]
(Example of Shape for Backrest of Seat)

A plate shaped member shown in FIGS. 8A and 8B is a plate member basically made of resin having a plate shape with small curved portion and having a thickness of 3 mm as a whole, and a large rectangular plate of Al alloy having a thickness of 1.5 mm for strengthening is disposed in the center thereof. While it seems to be not necessary to use also Al alloy plate having a thickness of 1.5 mm, this will be a matter to be decided through decent experiment, considering that a passenger with bodyweight of 200 kg may sit thereon and brake pedal may be slammed suddenly with full power.
[Example of Shape 6]
(Example of Shape for Bottom Board of Seat)

Figure 9:
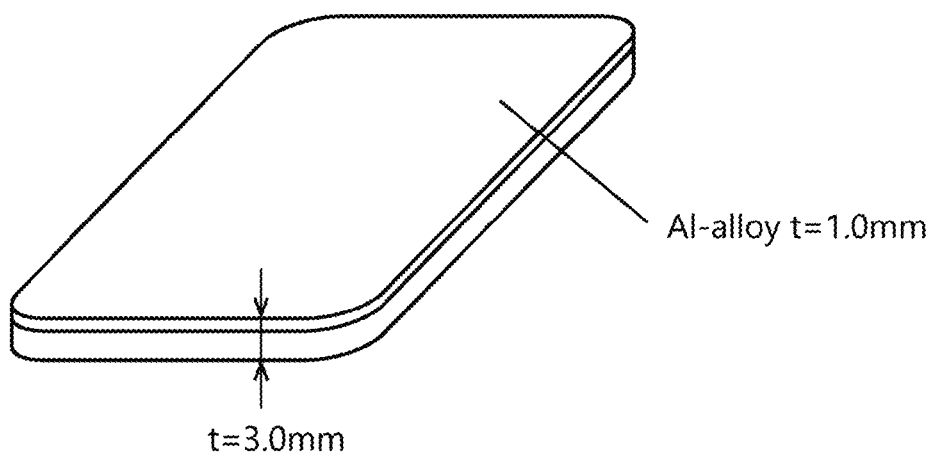
FIG. 9 is a view schematically showing a shape of an article joined by an injection molding obtained by injecting a particular polyamide resin composition into a metallic mold in which a plurality of Al alloy plate members as metal materials having been subjected to an improved NMT treatment have been inserted.

A plate shaped member shown in FIG. 9 has a structure such that a rectangular plate of Al alloy having a thickness of 1 mm is layered on a plain plate made of resin having a thickness of 3 mm as a whole.
[Example of Shape 7]

Figure 10:
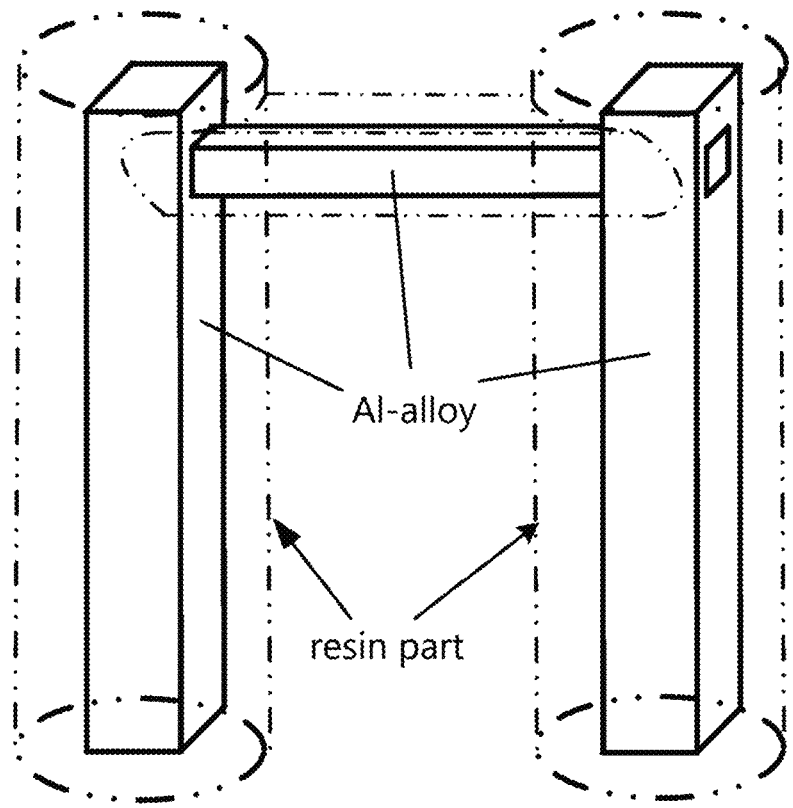
FIG. 10 is a view schematically showing a shape of an article joined by an injection molding in a form covered with a resin as a whole obtained by injecting a particular polyamide resin composition into a metallic mold in which several Al alloy rod members as gathered metal materials having been subjected to an improved NMT treatment have been inserted

A shaped article shown in FIG. 10 has a structure such that core members assembled with three square bars made of Al alloy are covered with resin material, that is, basically a shaped article in which Al ally is concealed. The square bars are prepared in such a manner that square bars obtained from malleable Al alloy A5083, A6061 or A2024 or through extrusion processing of Al alloy for casting are cut lengthwise to be square bars of square of about 5 mm and length of 10 mm or more, then these are subjected to chemical treatment of NMT. The shaped article is one in which three of the obtained square bars are assembled and inserted into a metallic mold for injection molding and, in the situation, resin is injected to form a joined article.

In the above explained Experimental Examples, such examples have been explained that specific polyamide resin composition "CM3506G50" is used particularly as crystalline thermoplastic resin composition in forming an integrated composite article of Al alloy material with crystalline thermoplastic resin composition through joining by injection molding. While "CM3506G50" provides such a high shear joining strength as 55 MPa when it is integrated with Al alloy through joining by injection molding to be a composite article, crystalline thermoplastic resin composition to be used is not limited to "CM3506G50". By improving further performance of resin, for example, by increasing content of GF in resin composition from 33.3% to 36%, 40%, etc., it will be possible to provide shear joining strength of 60 MPa or more. Further, it is also considered to prevent fire damage from enlarging at a time of ignition due to crash accident by adding suitable flame retardant material for securing clear flame retardant property.

What is claimed is:

1. A method for providing an integrated composite article made of a metal and a resin, comprising:
    forming the integrated composite article by:
        providing a crystalline thermoplastic resin composition as a resin material, containing: an aliphatic polyamide by 50% to 90% in a resin part and a semi-aromatic polyamide by 50% to 10% in the resin part, and a glass fiber by 30% to 35% in a total resin composition of the resin material is further provided in the crystalline thermoplastic resin composition;
        placing a plurality of plates of any of Al alloys A5052, A5083, A6061 and A2024 having a thickness of 0.5 mm to 0.9 mm and cut out to be of a rectangular form in a metallic mold for an injection molding, so as to set a position for insertion of each of the plurality of plates of any of Al alloys A5052, A5083, A6061 and A2024;
        closing the metallic mold; and
        injecting the crystalline thermoplastic resin composition into the metallic mold to form the integrated composite article;
    wherein the integrated composite article has a form after demolding, such that:
        each of the plurality of plates of any of Al alloys A5052, A5083, A6061 and A2024 is joined face to face with a molded article of resin in outer peripheral portions thereof, and
        the molded article of resin having a form of a plain plate including curved face portions and having a thickness of 2.5 mm or more and an area of 500 $cm^2$ or more,
    the integrated composite article being a plate shaped member provided as a roof, a fender, an outer face of a door, a bottom board of a seat, a backrest of a seat, of a moving machinery including an automobile.

2. A method for providing an integrated composite article made of a metal and a resin, comprising:
    forming the integrated composite article by:
        providing a crystalline thermoplastic resin composition as a resin material, containing: an aliphatic polyamide by 50% to 90% in a resin part and a semi-aromatic polyamide by 50% to 10% in the resin part, and a glass fiber by 30% to 35% in a total resin composition of the resin material is further provided in the crystalline thermoplastic resin composition;
        placing at least one of elongated plate of any of Al alloys A5052, A5083, A6061 and A2024 having a thickness of 1.0 mm to 1.5 mm in a metallic mold for an injection molding, so as to set a position for insertion of the at least one of elongated plate of any of Al alloys A5052, A5083, A6061 and A2024;
        closing the metallic mold; and
        injecting the crystalline thermoplastic resin composition into the metallic mold to form the integrated composite article;
    wherein the integrated composite article has a form such that:
        the at least one of elongated plate of any of Al alloys A5052, A5083, A6061 and A2024 is joined face to face with a molded article of resin in a central position thereof for a situation of having one elongated plate or in a parallelized form in an elongated direction for a situation of having a plurality of the elongated plates,
        the molded article of resin having a form of a plain plate and having a thickness of 2.5 mm or more and an area of 400 $cm^2$ or more,
    the integrated composite article being a plate shaped member provided as a roof, a fender, an outer face of a door, of a moving machinery including an automobile.

3. A method for providing an integrated composite article made of a metal and a resin, comprising:
    forming the integrated composite article by:
        providing a crystalline thermoplastic resin composition as a resin material, containing: an aliphatic polyamide by 50% to 90% in a resin part and a semi-aromatic polyamide by 50% to 10% in the resin part, and a glass fiber by 30% to 35% in a total resin composition of the resin material is further provided in the crystalline thermoplastic resin composition;
        placing at least one of square bar obtained from any one of Al alloys A5083, A6061 and A2024 or obtained through a machining process of square bar obtained through an extrusion processing of any one of Al alloys A5083, A6061 and A2024 for casting and having been subjected to a heat treatment and having a square of 5 mm and a length of 100 mm or more in a metallic mold for an injection molding, so as to set a position for insertion of the at least one square bar in a metallic mold, the square bar having been subjected to a chemical treatment of NMT;
        closing the metallic mold; and
        injecting the crystalline thermoplastic resin composition into the metallic mold to form the integrated composite article;
    wherein the integrated composite article having a form such that:
        the square bar is contained to be buried in a molded article of resin having a rod-shaped contour with a dimeter of 15 mm to 20 mm and a length of 50 mm to 150 mm in a central position thereof and a whole surface of the square bar is joined with the molded article of resin,
    the integrated composite article being provided as a member for a pillar portion of a seat including a driver seat or a passenger seat, of a moving machinery including an automobile.

* * * * *